US006898415B2

(12) United States Patent
Berliner et al.

(10) Patent No.: US 6,898,415 B2
(45) Date of Patent: May 24, 2005

(54) SYSTEM AND METHOD FOR REDUCING MULTIPATH DISTORTION IN WIRELESS DISTANCE MEASUREMENT SYSTEMS

(75) Inventors: Shlomo Berliner, Rehovot (IL); Alan Bensky, Rehovot (IL); Reuven Ameslem, Rehovot (IL); Efraim Zilber, Rehovot (IL)

(73) Assignee: AeroScout, Inc., Rehovot (IL)

( * ) Notice: Subject to any disclaimer, the term of this patent is extended or adjusted under 35 U.S.C. 154(b) by 692 days.

(21) Appl. No.: 09/759,600

(22) Filed: Jan. 16, 2001

(65) Prior Publication Data

US 2002/0142782 A1 Oct. 3, 2002

(51) Int. Cl.[7] .............................. H04B 1/00; H04B 15/00
(52) U.S. Cl. ................ 455/63.1; 455/67.13; 455/114.2; 455/501; 370/317; 375/346
(58) Field of Search ................................. 455/102, 132, 455/422, 424, 456, 457, 561, 562, 63.1, 67.13, 501, 114.2; 342/125, 118, 350, 417, 457; 370/310.2, 317, 329; 375/130, 298, 320, 322, 329, 346; 702/150

(56) References Cited

U.S. PATENT DOCUMENTS

| | | | |
|---|---|---|---|
| 3,619,058 A | | 11/1971 | Hewlett ......................... 356/5 |
| 3,681,695 A | * | 8/1972 | Cease et al. ................. 455/137 |
| 3,778,159 A | | 12/1973 | Hines et al. .................... 356/5 |
| 3,779,645 A | | 12/1973 | Nakazawa et al. ............. 356/5 |
| 4,017,859 A | | 4/1977 | Medwin ............... 343/100 CL |
| 4,229,737 A | * | 10/1980 | Heldwein et al. ............. 342/46 |
| 4,315,260 A | * | 2/1982 | Kupfer ......................... 342/86 |
| 4,328,499 A | | 5/1982 | Anderson et al. ....... 343/113 R |
| 4,433,335 A | | 2/1984 | Wind .......................... 343/463 |
| 4,633,411 A | | 12/1986 | Bliss et al. ................. 364/481 |
| 4,804,961 A | * | 2/1989 | Hane ........................... 342/125 |
| 4,851,851 A | | 7/1989 | Hane ........................... 342/112 |

(Continued)

FOREIGN PATENT DOCUMENTS

| | | |
|---|---|---|
| EP | 0 926 510 A1 | 6/1999 |
| WO | WO 256673 | 8/1996 |

OTHER PUBLICATIONS

The Official Bluetooth Website, 1 page. Internet source. Apr. 10, 2000.
Designing Cableless Devices with the Bluetooth Specification, 8 pages. Internet source. Apr. 10, 2000.
R.J. Palmer, "Test Results of a Precise, Short Range, RF Navigational/Positional System," IEEE Vehicle Navigation and Information Systems Conference (VNIS '89) (1st: 1989: Toronto), compiled and edited by D.H.M. Reekie, E.R. Case and J. Tsai, pp. 151–155.

*Primary Examiner*—William Trost
*Assistant Examiner*—Stephen D'Agosta
(74) *Attorney, Agent, or Firm*—Andrew M. Harris; Jeffrey D. Moy; Weiss, Moy & Harris, PCC.

(57) ABSTRACT

A system and method is capable of identifying multipath wireless signals, their relative strength, and their position. The system and method may be used in wireless distance measurement to generate a distance measurement free of multipath distortion. First and second wireless devices transmit and receive signals to generate multipath information. For distance measurements, this information may be used to calculate the true distance between two wireless devices that is compensated for multipath. The system and method may be used in a mobile wireless communications system to discriminate between various mobile wireless communications devices located in a region, for example, to conduct a commercial transaction or transmit or receive other information.

19 Claims, 21 Drawing Sheets

U.S. PATENT DOCUMENTS

| | | | |
|---|---|---|---|
| 5,082,364 A | 1/1992 | Russell | 356/5 |
| 5,099,248 A | 3/1992 | Brommer | 342/430 |
| 5,136,298 A | 8/1992 | Williams | 342/112 |
| 5,170,172 A | 12/1992 | Weinstein | 342/458 |
| 5,173,709 A | 12/1992 | Lauro et al. | 342/443 |
| 5,428,439 A | 6/1995 | Parker et al. | 356/5.01 |
| 5,448,248 A | 9/1995 | Anttila | 342/400 |
| 5,481,503 A | 1/1996 | Kuhn et al. | 367/100 |
| 5,596,330 A * | 1/1997 | Yokev et al. | 342/387 |
| 5,687,196 A | 11/1997 | Proctor, Jr. et al. | 375/347 |
| 5,694,133 A | 12/1997 | Ghose | 342/372 |
| 5,724,047 A | 3/1998 | Lioio et al. | 342/442 |
| 5,745,224 A | 4/1998 | Oda et al. | 356/4.01 |
| 5,767,409 A | 6/1998 | Yamaguchi | 73/602 |
| 5,781,282 A | 7/1998 | Oda et al. | 356/5.03 |
| 5,784,339 A | 7/1998 | Woodsum et al. | 367/134 |
| 5,815,117 A | 9/1998 | Kolanek | 342/442 |
| 5,828,693 A | 10/1998 | Mays et al. | 375/202 |
| 5,883,598 A * | 3/1999 | Parl et al. | 342/457 |
| 6,556,942 B1 * | 9/2000 | Smith | 702/150 |
| 6,148,195 A * | 11/2000 | Schuchman et al. | 455/424 |
| 6,259,404 B1 * | 7/2001 | Parl et al. | 342/457 |
| 6,437,740 B1 * | 8/2002 | De Champlain et al. | 342/417 |
| 6,489,923 B1 * | 12/2002 | Bevan et al. | 342/378 |

* cited by examiner

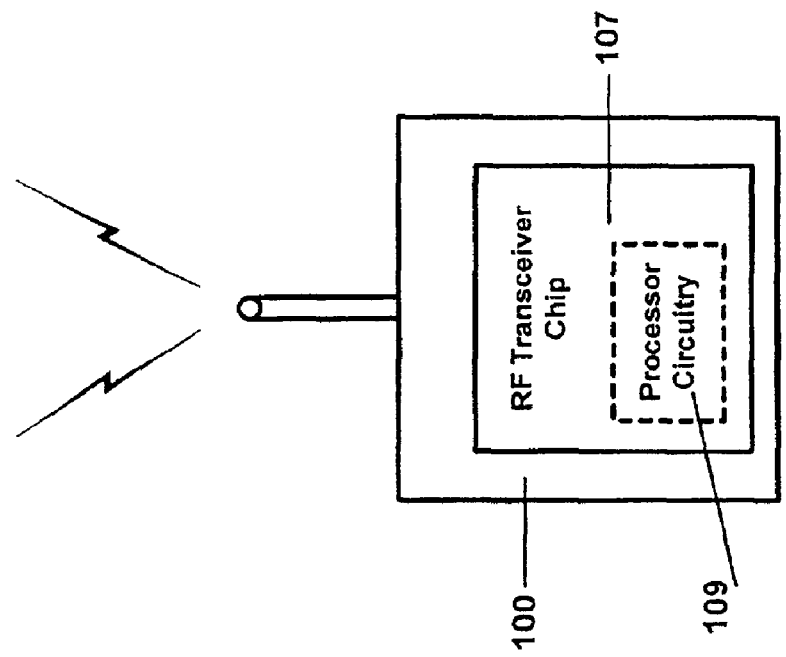
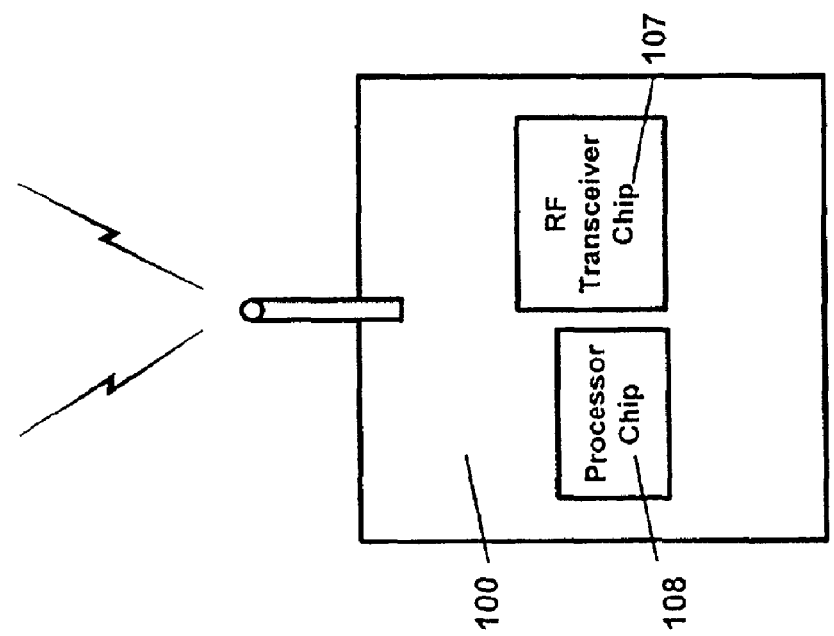

FIG. 8 REMOTE STATION

FIG. 8 BASE STATION

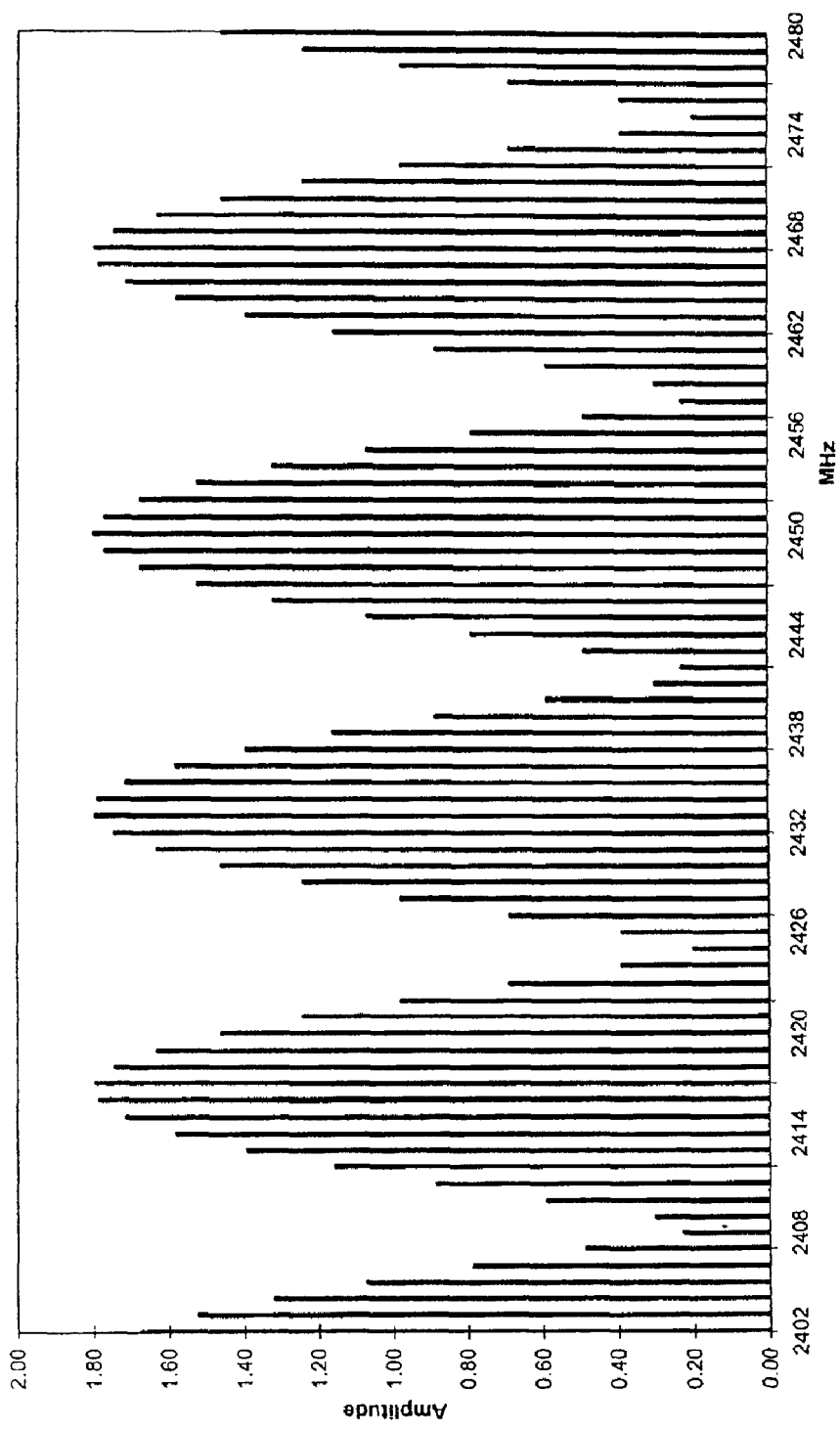

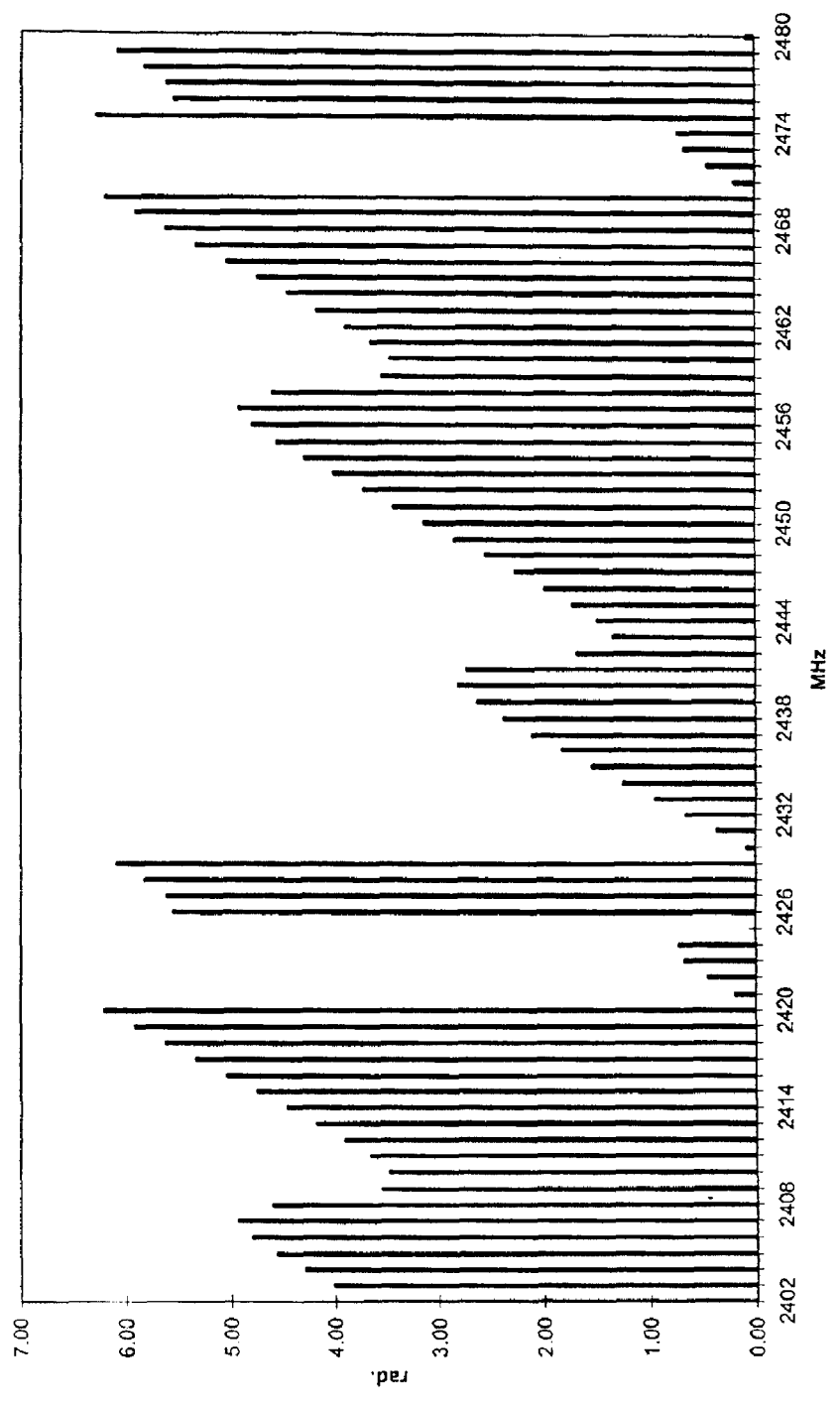

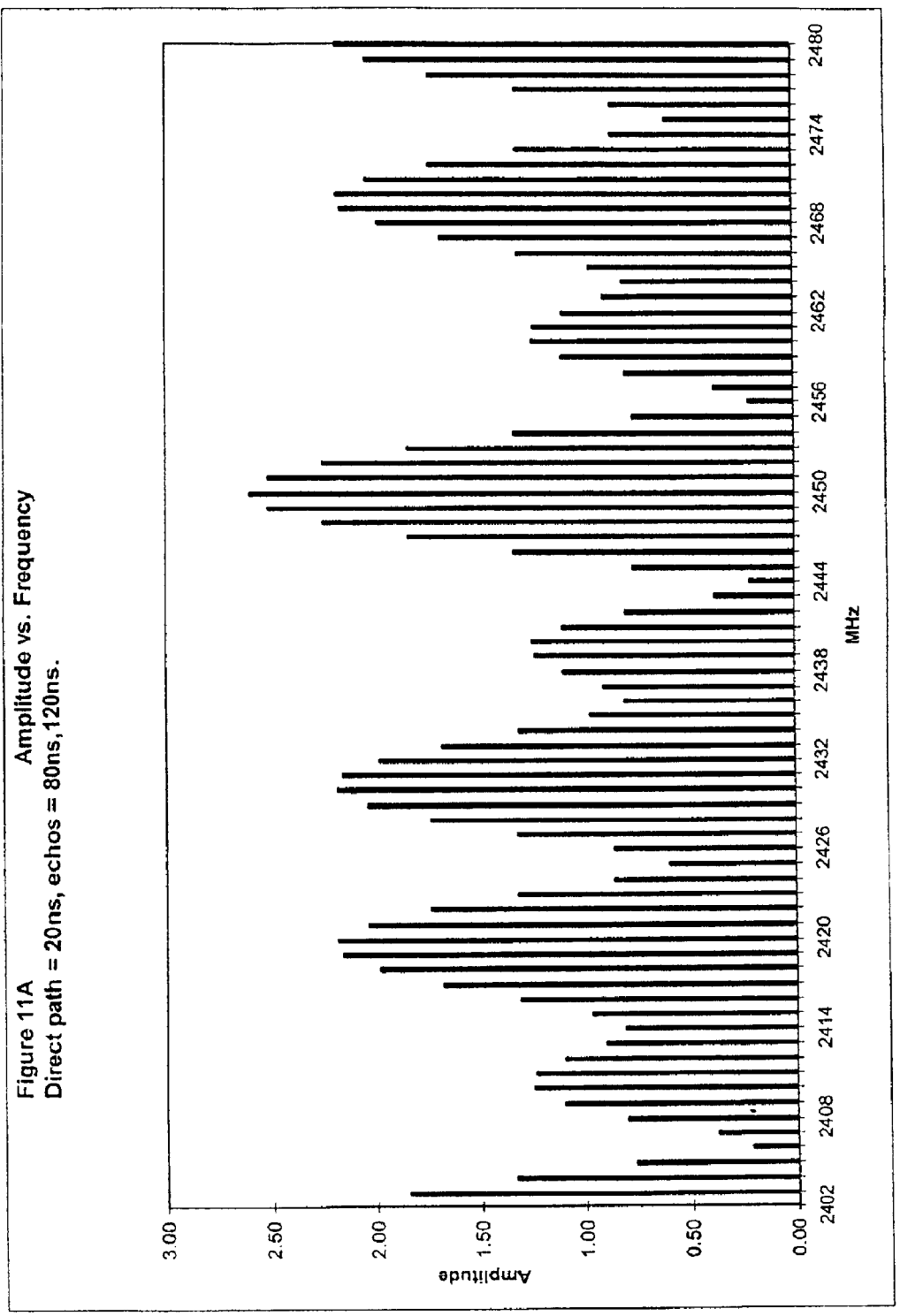

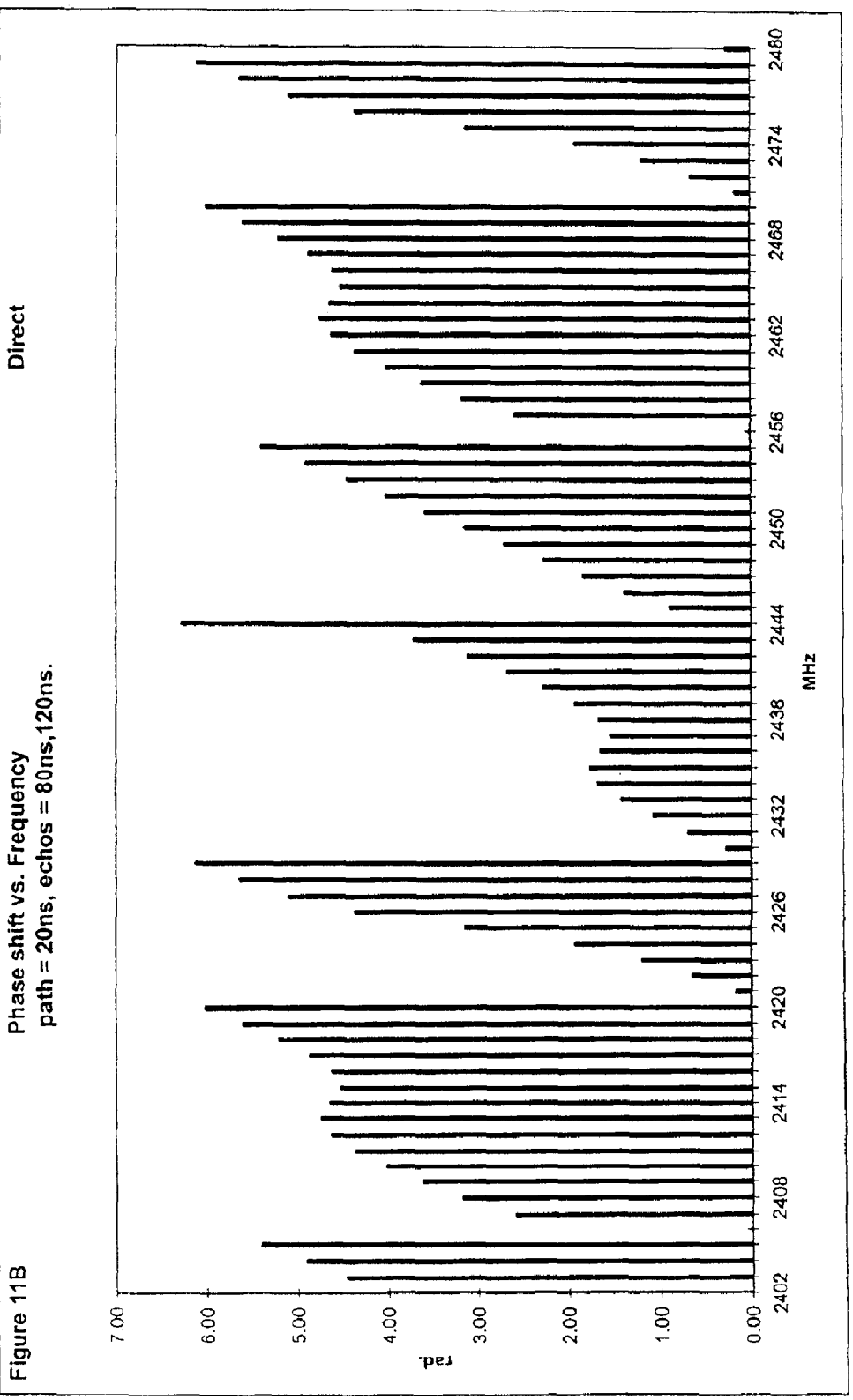

SYSTEM AND METHOD FOR REDUCING MULTIPATH DISTORTION IN WIRELESS DISTANCE MEASUREMENT SYSTEMS

BACKGROUND OF THE INVENTION

1. Field of Invention

The present invention relates to a system and method for identifying multipath wireless signals, their relative strength, and their position. More specifically, the present invention relates to a system and method for reducing multipath distortion in wireless distance measurements.

2. Description of the Related Art

Mobile telephones, pagers, and other wireless communication equipment are now commonplace. More recently, laptop computers, personal digital assistants (PDAs)—such as the Palm™ organizer—have been equipped with wireless communications capabilities. One of the primary benefits of wireless equipment is portability. We can carry our mobile phone with us wherever we go. These wireless devices are currently used for relatively limited purposes, such as making telephone calls, when they are capable of doing much more.

One potential use for wireless devices is in mobile commerce. Wireless devices can be used for buying or selling goods or services, making payments, gathering information, advertising and promotion, and the exchange of information for other commercial or non-commercial purposes. The success of mobile commerce and other wireless applications will depend on their acceptance by consumers at large. Accordingly, wireless applications must be easy to use and convenient. New platforms are being developed to enable mobile commerce and other applications for wireless devices. Bluetooth is such a technology. Bluetooth provides a wireless networking protocol for linking various wireless equipment, such as mobile computers, mobile phones, and PDAs. Bluetooth operates in the Industrial Scientific and Medical (ISM) 2.4 GHz region.

In addition to platforms such as Bluetooth, wireless devices require additional enabling technologies to reach their full potential. One such technology involves distance measurement. The distance between two or more wireless devices may be needed in a variety of applications. In many cases, it may be undesirable to measure the distance between two wireless devices directly. Direct distance measurement may be impossible, impractical, intrusive, or simply inconvenient. Moreover, because one or more wireless devices may be moved, the distance between devices will not be fixed indefinitely and recalculation may be needed.

When measuring the distance between wireless devices, one potential source of inaccuracy is caused by multipath distortion. FIG. 12 illustrates the multipath phenomenon. As shown in FIG. 12, a transmitter 10 transmits wireless signals 15 to a receiver 20. The wireless signals 15 may travel in several different paths from the transmitter 10 to the receiver 20 due to reflection and/or diffraction of the wireless signals 15. For example, buildings, clouds, the earth, and trees may reflect portions of the wireless signals. FIG. 12 illustrates a single point of reflection 17 for simplicity. It should be understood that numerous points of reflection and/or diffraction may exist. The signal received by the receiver 20 is a combination of wireless signals 15 from all of the different paths. FIG. 12 illustrates a signal 15 traveling in a direct path P1 from transmitter 10 to receiver 20 and a signal 15 traveling in a reflected path P2. Path P2 is longer than the first path P1. Consequently, the signal 15 travelling in path P2 will arrive at the received 20 after the signal 15 travelling in path P1 and may have a different phase, depending on the relative distance between P1 and P2 and the wavelength of the signal 15. If receiver 20 bases its distance measurement on wireless signals in path P2 rather than path P1, the measured distance will be inaccurate.

The multipath phenomenon has been recognized in pagers and mobile telephones. In this context, the combination of wireless signals may cancel each other out making reception difficult. This is sometimes referred to as multipath interference. Efforts have been made to reduce multipath interference in order to improve the signal-to-noise ratio or bit error rate of the received signal. For example, in one technique, two or more signals with relatively non-coherent amplitudes may be transmitted using space, frequency, time or antenna polarity diversity. Multipath interference is avoided by selecting the strongest received signal for detection and demodulation. According to this method, the particular path or paths taken by the strongest signal is not important. RAKE receivers provide an example of time-diversity reception in direct sequence spread spectrum communications. The receiver de-correlates the received signal by applying several time-delayed versions of the known pseudo-random sequence used by the transmitter. The signal from the direct path (if there is one) and the strongest echoes may be de-correlated and combined to generate a signal having a lower bit error rate than can be obtained from the signal from any one of the paths.

Where the wireless signals are digitally modulated, an adaptive equalizer may be deployed at the receiver. Adaptive equalizers pass the receive signal through a tapped delay line. The tap take-off parameters are adaptively adjusted to cancel out echoes. As a further alternative, directional antennas may be used at one or both of the transmitter and receiver. At the transmitter, a directional antenna limits the number of paths that the transmitted wireless signal may take. At the receiver, a directional antenna reduces the number of paths from which wireless signals can be received. In either case, the direct signal path can be strengthened in relation to the reflected or echo signals. However, directional antennas are inconvenient and have limited use because they must be oriented to direct or receive the wireless signals.

In wireless distance measurements, the problem is not to increase the signal-to-noise ratio or bit error rate irrespective of signal propagation time or distance. The object is to identify the direct path signal as closely as possible. If reflected signals contribute significantly to the measurement, the resulting distance will be inaccurate. One aspect of the present invention is to reduce such inaccuracies.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIGS. 4A–4B are illustrative block diagrams of the base station according to FIG. 2.

FIG. 8 is an illustrative functional block diagram of a base station and remote unit in accordance with an embodiment of the present invention.

FIG. 10A provides a graph of received signal power as a function of frequency in a hypothetical case having one multipath echo.

FIG. 10B provides a graph of the phase of the received signal as a function of frequency in the hypothetical case having one multipath echo.

FIG. 11A provides a graph of received signal power as a function of frequency in a hypothetical case having two multipath echoes.

FIG. 11B provides a graph of the phase of the received signal as a function of frequency in the hypothetical case having two multipath echoes.

DETAILED DESCRIPTION

By way of overview, the present invention enables the number, position, and/or relative strength of multipath signals to be identified. In the context of distance measurement, the present invention permits the direct path between two wireless devices to be identified from among other paths taken by the transmission signal. In particular, the present invention may be used to correct wireless distance measurements for inaccuracies caused by the multipath phenomenon. The present invention is capable of determining the distance between two wireless devices using only the two wireless devices, as described in further detail below. To achieve this result, a first wireless device transmits a forward path signal to a second wireless device. The second wireless device generates a reverse path RF signal sequence using the forward path signal such that the forward and reverse path signals are coherent. The reverse path RF signal sequence includes different frequencies that have the same or substantially the same multipath characteristics.

A wireless receiver of the first wireless device receives and generates amplitude and phase information using the reverse path RF signals and the forward path signal. A curve drawn from the received amplitude information and frequencies will be periodic in frequency with the period depending on the relative amplitude and delays of the reflected or echo signals. The first wireless device converts, for example, by inverse Fourier transform, the amplitude, phase, and frequency information into time domain data. The time domain data indicates the number, time delay, and relative amplitude of the echoes composing the received signal. For distance measurement application, the time domain data is sufficient to distinguish the direct path signal from the echo signals and correct the measured distance from effects of multipath distortion. After the direct path signal is distinguished and all other paths are filtered out, a Fourier transform can be applied, resulting in a flat frequency response and a linear phase shift. This information is sufficient to determine the measured distance, for example, as demonstrated in U.S. patent application Ser. No. 09/759,601, filed concurrently herewith and expressly incorporated by reference. A direct reading of the propagation delay of the direct path may also be determined.

Figure 1:
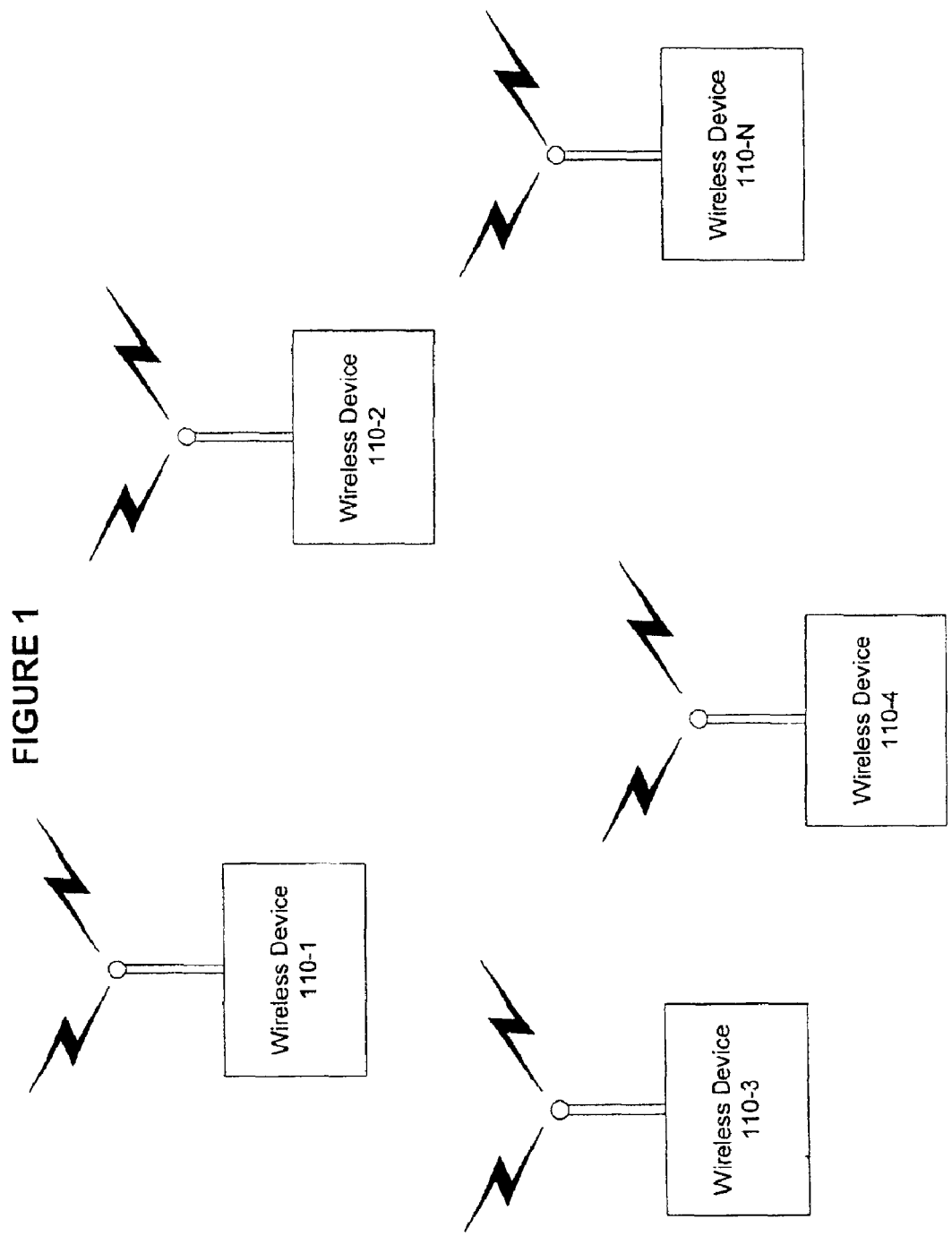
FIG. 1 is a block diagram illustrating an example of multiple electronic devices in accordance with the present invention.

FIG. 1 provides a block diagram illustrating an embodiment of a wireless communication system in which the present invention may be used. As shown in FIG. 1, the system includes a plurality of wireless devices 110-1 to 110-N (collectively referred to as wireless devices 110) within a particular region. The wireless devices 110 may be communications devices capable of transmitting and receiving information between devices. The information communicated may be data or voice information. At least one and possibly all of the wireless devices 110 are mobile communications devices. For example, the wireless devices 110 may be mobile phones or pagers, or PDAs, handheld computers, laptop computers, or other devices equipped with wireless communications capabilities, or a combination of any of the foregoing. Moreover, the set of wireless devices 110 in the region is not necessarily fixed. Additional wireless devices 110 may enter the region and existing wireless devices 110 may leave the region. It should be understood, however, that the present invention may be used with stationary wireless devices.

To facilitate communications, each wireless device 110 includes one or more antennas. In a preferred embodiment, the antennas are omnidirectional antennas so that a particular wireless device 110 can communicate with any of the other wireless devices 110 within its operable range without regard to where the other wireless devices 110 are located. Of course, other antenna designs may be used with any one or more of the wireless devices 110.

Each of the wireless communications devices 110 may store unique identifying data that it can transmit to the other wireless communication devices 110 in the region. Accordingly, each wireless communication device 110 can identify itself to the other communication devices 110 and distinguish between other wireless communication devices using the identifying data. For example, a wireless device 110-1 can broadcast RF signals containing communication data intended specifically for wireless device 110-3. By including the identifying data in the RF transmission, wireless device 110-3 can receive and perform actions responsive to the communication data, while other wireless devices 110 ignore the data. The communication data may be, for example, commercial data exchanged in a commercial transaction between owners or users of wireless devices 110-1 and 110-3. Alternatively, or in addition, the communication data may include advertising data, news, weather, or other useful information.

Communications between the wireless devices 110 can be carried out using a protocol employing a master-slave relationship. However, other protocols may be used. In the case of a master-slave protocol, one of the wireless devices 110 in a particular region may be a master with one or more others of the wireless devices 110 in the region serving as a slave. The master device will control communications carried out with the slave devices. In one embodiment, the wireless devices 110 communicate using the Bluetooth protocol, but of course other protocols may be used. The Bluetooth protocol uses a half-duplex, frequency-hopping scheme operating in the 2.4 GHz band. Bluetooth devices hop through 1600 frequency channels per second, with 800 transmit and 800 receive channels. The channels may have a 1 MHz spacing and span a total of 79 MHz. Information signals may be communicated using gaussian frequency shift keying (GFSK). Bluetooth allows various wireless equipment (mobile phones, mobile computers, etc.) to communicate over relatively short range of about 100 meters. However, the range may vary depending on the transmission power and receiver sensitivity.

Figure 2:
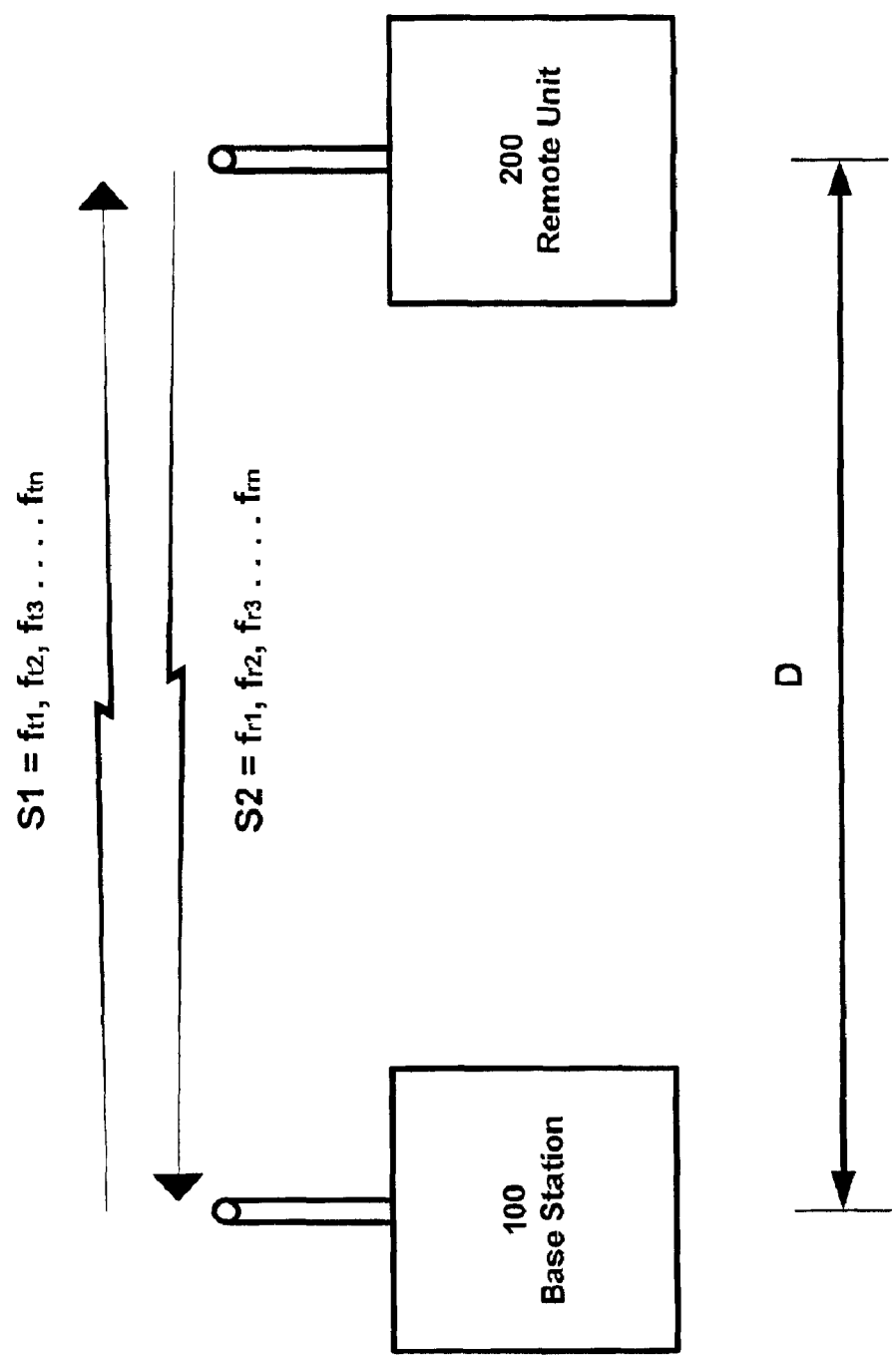
FIG. 2 is an illustrative block diagram of a base station and remote unit in accordance with an embodiment of the present invention.

FIG. 2 illustrates the operation of an embodiment of the present invention. For simplicity, the operation of the present invention will be described with reference to two wireless devices: a base station 100 and a remote unit 200. The base station 100 and the remote unit 200 may be wireless communication devices 110, as shown in FIG. 1. Base station 100 and remote unit 200 may have the same or different structure depending on their class of device. As shown, the base station unit 100 is separated from the remote unit 200 by a distance D. As described above, the base station may be measure the differential phase between two or more frequencies of a signal transmitted between the base station 100 and the remote unit 200. In one embodiment of the present invention, frequency hopping is used by the base station 100 and the remote unit 200 to generate the transmitted signals.

A signal S1 using a sequence of carriers at frequencies $f_{t1}$, $f_{t2}$, ... $f_{tm}$ is generated at base station 100 and transmitted to remote unit 200. At remote unit 200, the signal S1 is received and demodulated. The demodulated signal is used as a reference to generate a second signal S2. Signal S2 includes a sequence of carriers having frequencies $f_{r1}$, $f_{r2}$, ... $f_{rm}$. The remote unit transfers the phase information of signal S1 to signal S2. The frequencies in each sequence of carriers may be in ascending order, in descending order, another pattern, or in random order, for example. Additionally, the spacing between adjacent carrier frequencies contained in a sequence (i.e., irrespective of their order in the sequence) may be constant, vary according to a pattern, skip some frequencies, or occur randomly within a range. Thus, base station 100 and remote unit 200 remain synchronized, or phase locked, with each other. Signal S2 is transmitted from the remote unit 200 back to the base station 100 where it is frequency converted to the frequencies of signal S1 and phase compared with the signal S1. Alternatively, an additional RF signal, phase coherent with S1, may be generated in base station 100 and be used to do the phase comparison with S2. This arrangement obviates the need to frequency convert S2 before performing the phase comparison.

Phase comparison of the corresponding frequency increments of signal S1 and frequency converted signal S2 provides a phase offset Θi for each of the frequencies. The phase comparison may also yield amplitude information of the received signal S2. Alternatively, the amplitude information of the received signal may be obtained separately. Accordingly, the base station 100 may store phase and amplitude information (e.g., in polar or Cartesian co-ordinates) for each frequency of the received signal S2. The base station 100 can use this information to identify multipath signals, their relative strength, and position and correct for multipath distortion in distance measurements.

The embodiment illustrated in FIG. 2 is directed to a full-duplex system in which signal transmission and reception occur simultaneously requiring the frequencies of S1 to be different from the frequencies of S2. However, as will be described below, the present invention could also be implemented, for example, in a half-duplex manner allowing the use of the same frequencies for signals S1 and S2, thereby obviating the need to convert the frequencies of signal S2 to the frequencies of S1, or the frequencies of signal S1 to the frequencies of S2, for phase comparison.

RF communications, control, and processing functionality of the base station 100 may be performed by common equipment, for example, under different software control, or may be performed by different equipment. Examples are described below in connection with FIGS. 3A, 3B, and 3C. However, it should be understood that control, processing, and RF communications functionality may be performed by various equipment configurations depending on the type of device that base station 100 embodies and the degree of overlap and compatibility between the distance measurement functionality and other functionality of the base station 100.

For example, if the base station 100 is a Bluetooth-enabled mobile telephone, the base station 100 requires RF communications for mobile telecommunications, distance measurement, and Bluetooth communications. The same or different control and/or RF equipment may be used for wireless communications to network infrastructure (e.g., mobile telephone to cellular base station), for distance measurement, and for direct wireless device-to-wireless device (e.g., Bluetooth) communications. The same may be true of a Bluetooth-enabled laptop with a RF modem for linking to an ISP and many other devices equipped for wireless communications using multiple different protocols. On the other hand, the base station 100 may embody a wireless device that supports distance measurement and a single wireless communications protocol (e.g., a Bluetooth-equipped vending machine, a mobile telephone, laptop with an RF modem, etc.). The same or different control and/or RF equipment may be used for wireless communications and for distance measurement. Finally, the base station 100 may be equipped for RF communication only to perform wireless distance measurement. In this case, only a single RF communications equipment for distance measurement need be provided.

Figure 3A:
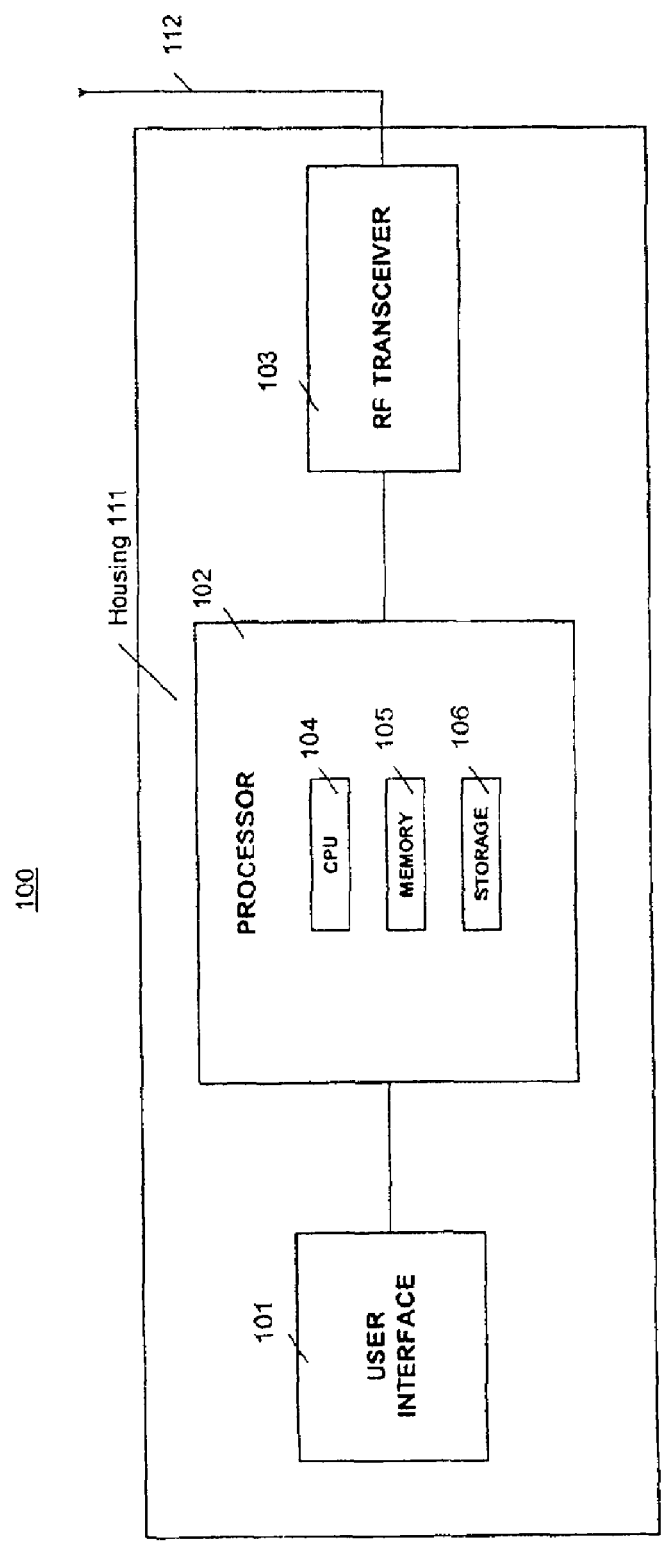
FIGS. 3A–3C are illustrative block diagrams of the base station according to FIG. 2 having an RF transceiver, processor, and user interface.

FIG. 3A is a functional block diagram illustrating some of the components of the base station 100 according to an exemplary embodiment. The base station 100 may a mobile telephone, a PDA, handheld computer, laptop computer, desktop computer, a vending machine, cash register, or other equipment. The base station 100 is shown generally in FIGS. 3A–3C simplicity. It should be understood that the exact structure of the base station 100 may differ from, or include additional elements than, that shown in FIGS. 3A–3C, depending on the nature of the base station 100.

As shown, base station 100 includes a user interface 101, a processor 102, an RF transceiver 103, a housing 111 for housing the components, and an antenna 112. Housing 111 may be used to house equipment that make up base station 100. Base station 100 and housing 111 may be sized and equipped to be readily transported and permit stand-alone operation. For example, housing 111 may be sized to be a handheld device, such as a PDA or mobile phone. Antenna 112 may be an omnidirectional antenna or a directional antenna. Antenna 112 may be contained within housing 111 or may protrude therefrom.

The processor 102 further includes a central processing unit (CPU) 102, memory 105, e.g., DRAM, and data storage medium 106. The user operates the base station through the user interface 101. User interface 101 can include any number of input controls and output devices, such as a visual display, a keypad, pointer, a mouse, tracking ball, a four-button pad, speaker(s), a microphone, or any combination of the foregoing.

Processor 102 is coupled between the user interface 101 and the RF transceiver 103. Processor 102 receives and processes phase and amplitude data (e.g., I and Q data, as will be used in the following examples) from the RF transceiver 103. The processor may use the phase and amplitude data to calculate a distance measurement, which can be displayed on the user interface or used to control a distance-based process. The processor 102 also controls the transceiver 103 and receives control information from the user interface 101. The I/Q data from the RF transceiver 103 is typically stored in memory 105 for processing by CPU 104. Further, storage space 106 contains program instructions for the CPU as well as other static data such as the device ID information. In handheld devices, storage 106 is typically a non-volatile read only memory. In larger base station implementations, the storage space can be a hard disk drive. It is anticipated that the program instructions for the processor 102 can be embedded for storage, transport, or sale, in any suitable computer readable mediums, such as a floppy diskette, optical disk, a memory chip or a memory portion of a chip, or can be stored on a server and downloaded to the processor for use. The RF transceiver 103 is typically implemented as a combination of discrete components or a smaller number of integrated chipsets.

In addition to calculating the distance, for example, as described below, the processor 102 and the transceiver 103 may operate to communicate according to one or more communication protocols using the same or different frequencies than used for distance measurement. For example, if the base station 100 were a mobile telephone, the processor 102 and transceiver 103 may be used to handle mobile telephone communications. For example, the base station may transmit and receive communications signals with a cellular station, a satellite, or other network switching infrastructure. In addition, the processor 102 and transceiver 103 may be used to handle other communications protocol(s), such as Bluetooth, for example. The base station 100 may communicate directly with other wireless devices. In this regard, the base station 100 may use common equipment for distance measurement and for other communications. Alternatively, the RF transceiver 103 may be used solely for distance measurement.

Figure 3B:
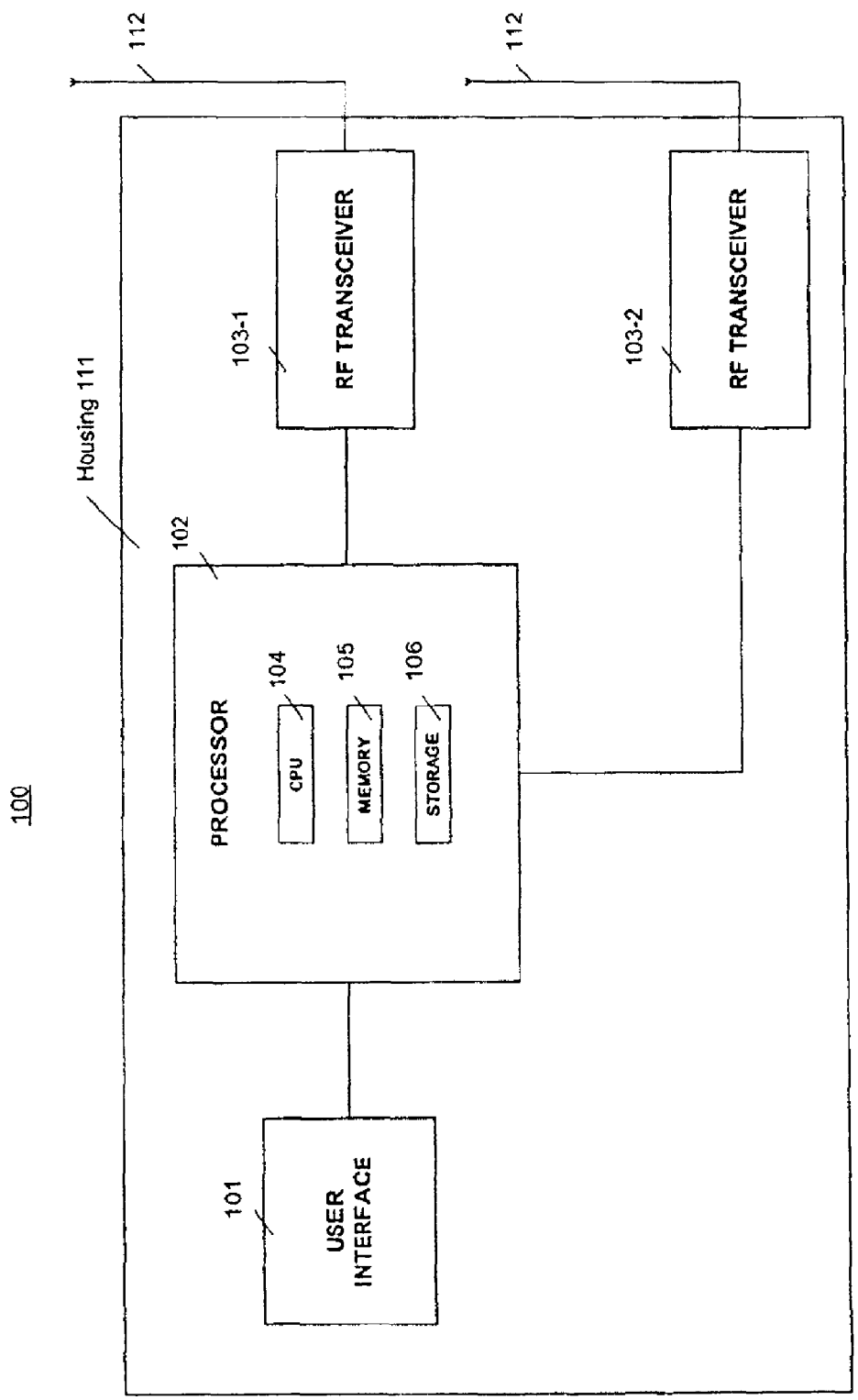

FIG. 3B illustrates a further exemplary embodiment of a base station 100. FIG. 3B is similar to FIG. 3A, but includes RF transceiver 103-1 and RF transceiver 103-2. RF transceivers 103-1 and 103-2 may share a common antenna structure or have separate antennas. In accordance with the embodiment of FIG. 3B, the RF transceiver 103-1 may be used for communications according to a first set of one or more communications protocols and RF transceiver 103-2 may be used for distance measurements and possibly communications according to a second set of one or more communications protocols. Processor 102 controls transceivers 103-1 and 103-2 and may process information received from either or both transceivers. In accordance with FIG. 3B, the base station 100 may be, for example, a mobile FIG. 3B. RF transceiver 103-1 may handle telephone communications and RF transceiver 103-2 may handle distance measurement RF transmissions and possibly other communications, such as Bluetooth communications.

Figure 3C:
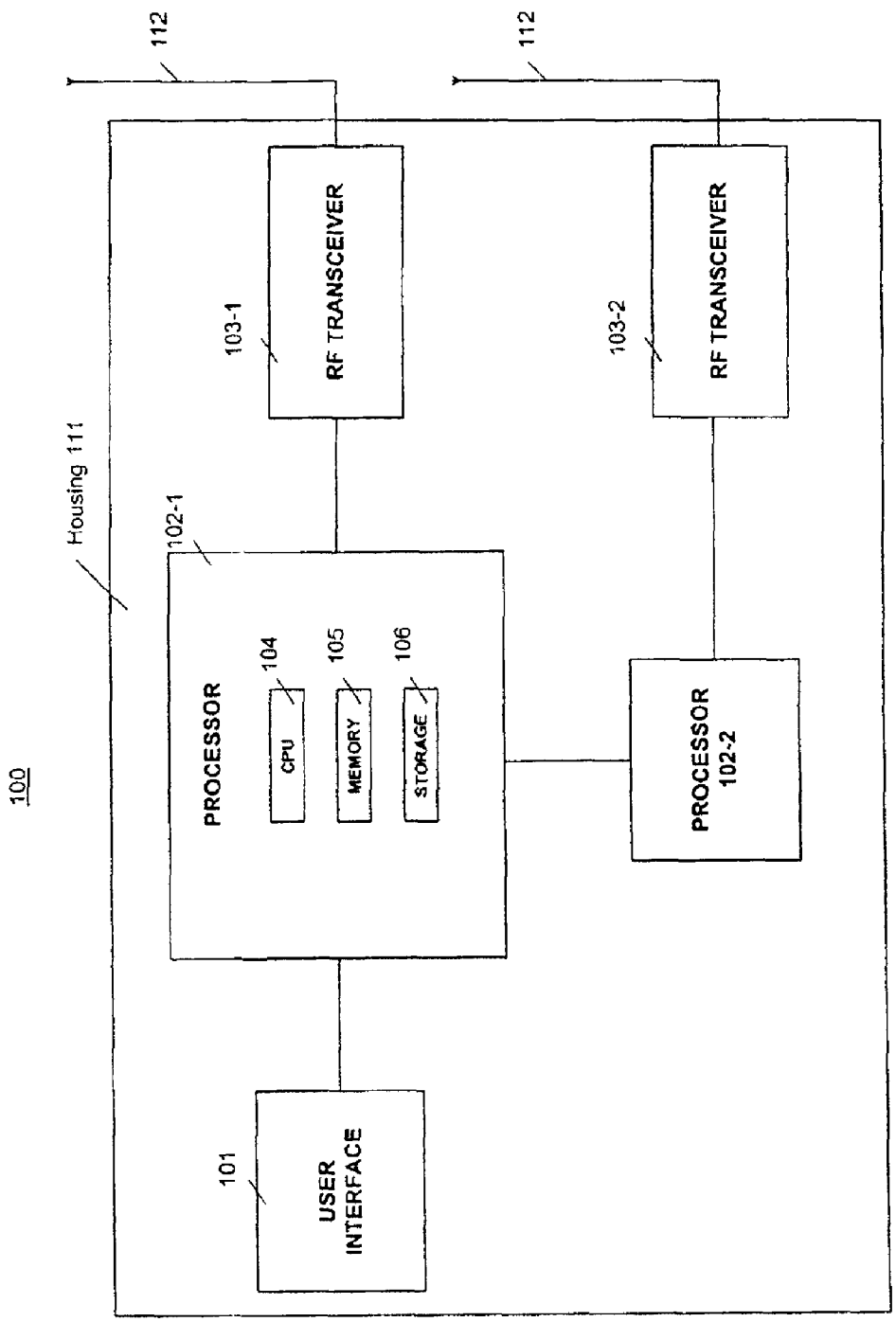

FIG. 3C illustrates a further exemplary embodiment of a base station 100. FIG. 3C is similar to FIG. 3A, but includes processors 102-1 and 102-2 and transceivers 103-1 and 103-2. In accordance with the embodiment of FIG. 3C, the processor 102-1 and RF transceiver 103-1 may be used for communications according to a first set of one or more communications protocols and processor 102-2 and RF transceiver 103-2 may be used for distance measurements and possibly communications according to a second set of one or more communications protocols. Processor 102-1 controls and may process data from transceiver 103-1 and processor 102-2. Processor 102-2 controls and processes information from RF transceiver 103-2. Processor 102-2 also communicates with processor 102-1. In accordance with FIG. 3C, the base station 100 may be, for example, a mobile telephone. RF transceiver 103-1 may handle telephone communications and RF transceiver 103-2 may handle distance measurement RF transmissions and other communications, such as Bluetooth communications. Processor 102-1 may be used to control mobile telephone communications and perform overall device control. Processor may be used for controlling distance measurement control, such as mathematical processing, and perform control operations for another communications protocol, e.g., Blueooth. The embodiments of FIGS. 3B and 3C are useful, for example, where the distance measurement functionality is added to an existing device design. In the embodiment of FIG. 3B, the processor 102 of the existing device may be loaded with software for performing distance measurement calculations. FIG. 3C provides an alternative where the processor 102-1 is not capable or would not be efficient for performing the distance measurement calculations.

FIGS. 4A and 4B show two alternative implementations of the present invention in base station 100. As shown in FIG. 4A, the distance measurement functionality may be implemented as a separate processor chip 108 and used in conjunction with a RF transceiver chip 107. The processor chip 108 may be, for example, a general purpose microprocessor, a math processor, or an ASIC built using, for example, CMOS technology. The RF transceiver chip 107 may be, for example, a Bluetooth chip or other RF communications chip. The RF transceiver chip 107 may be built using bipolar technology or BiCMOS technology.

Alternatively, as shown in FIG. 4B, the RF transceiver chip 107 may include memory 109 and processor circuitry 110 for performing distance measurement calculations. The processor circuitry 110 may be general purpose processing circuitry or a specially-designed circuit for performing distance measurement calculations. Accordingly, the RF transceiver chip 107 may output a distance value directly. The RF transceiver chip 107 may be a Bluetooth chip. Other platforms will be known to those skilled in the art and are within the scope of the present invention.

While the embodiments FIGS. 3A–3C and 4A–4B are described above in connection with a distance measurement application, it should be clear that the embodiments may be used for other applications for which it is useful to identify multipath transmissions.

Figure 5:
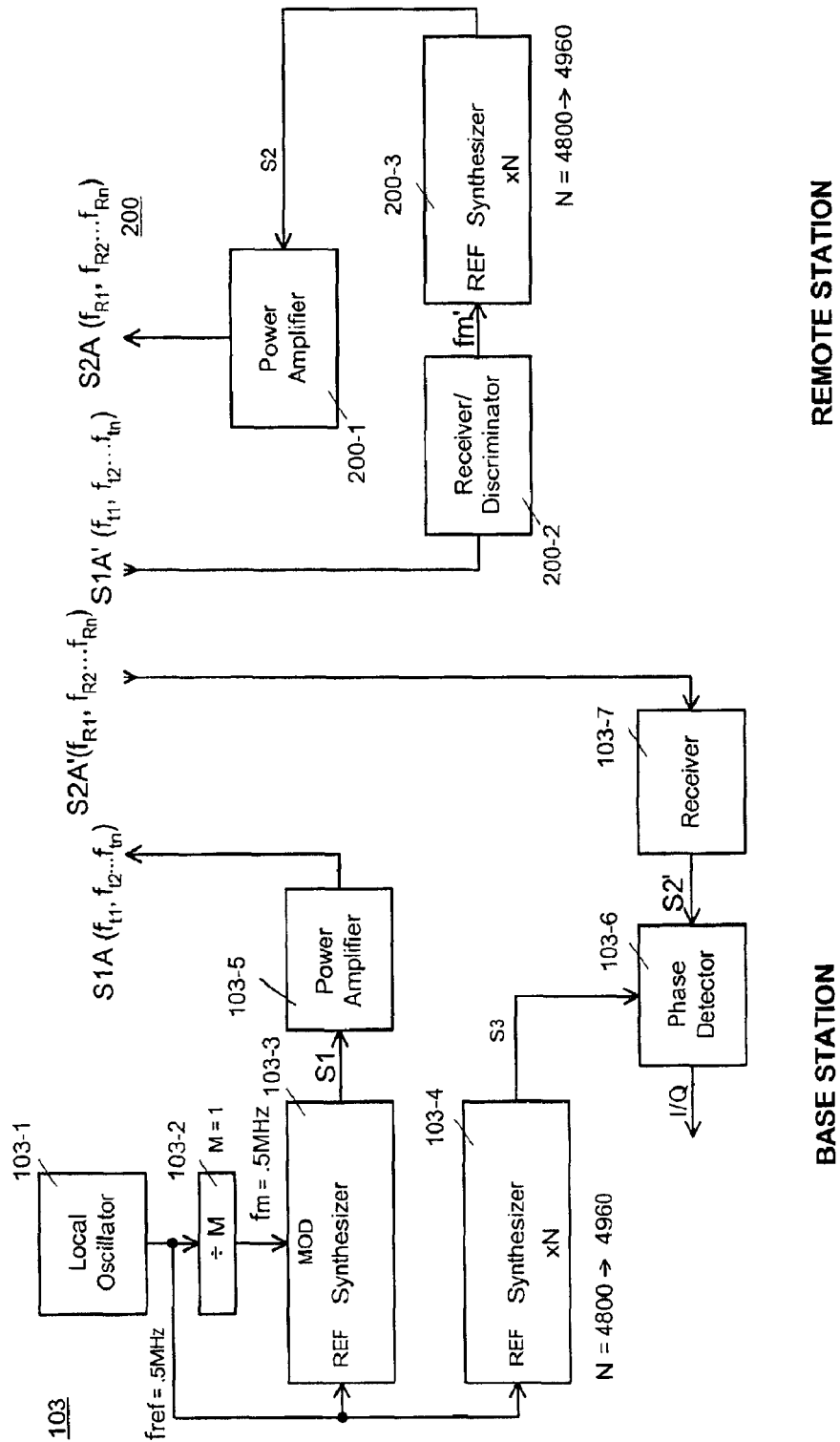
FIG. 5 is an illustrative functional block diagram of a base station and a remote unit in accordance with an embodiment of the present invention.

FIG. 5 illustrates exemplary RF circuitry that may be included in the base station 100 and the remote station 200.

FIG. 5 has been simplified for purposes of explanation and is not intended to show every feature of the base station 100 and the remote station 200. As shown, the base station 100 includes a local oscillator 103-1, divider 103-2, synthesizer 103-3, synthesizer 103-4, power amplifier 103-5, phase detector 103-6, and receiver 103-7. Local oscillator 103-1 generates a system clock, or reference frequency fref, which is coupled to the reference inputs of synthesizers 103-3 and 103-4. In this example, the value of fref will be set to 0.5 MHz. Of course, this and other numerical examples described herein are intended to be illustrative and are not intended to limit the present invention. System clock fref is also divided by divider (M) 103-2 to generate a modulation signal fm. Integer M can be set to an integer value of at least one or higher. In this case, M will be set to a value of 1. Consequently, in this example, fm is also equal to 0.5 MHz. Modulation signal fm is coupled to the modulation input of synthesizer 103-5. Because modulation signal fm is derived from fref, it maintains phase coherency with fref. Likewise, because the carriers having frequencies $f_{t1}, f_{t2}, \ldots f_{tn}$ are derived from fref, phase coherency between these carriers having frequencies $f_{t1}, f_{t2}, \ldots f_{tn}$ and signals fref, and fm is maintained.

Synthesizer 103-3 generates a frequency hopping spread spectrum (FHSS) signal S1, which is comprised of a sequence of carriers at different frequencies. Each carrier is a multiple of the reference frequency fref. Signal S1 is modulated by fm and coupled to the input of power amplifier 103-5. Signal S1 is therefore comprised of a sequence of carriers, each modulated by fin. Power amplifier 103-5 amplifies S1 to produce amplified signal S1A. Signal S1A is propagated over distance D to the remote unit 200.

Synthesizer 103-4 generates an FHSS signal S3, which is comprised of a sequence of carriers at different frequencies. Each carrier is a multiple of the reference frequency fref. Each of the carriers in the sequence of carriers of signal S3 has a corresponding carrier from the sequence of carriers of S1. Typically, in a full duplex design, signals S1 and S3 are required to be within different frequency bands.

Receiver 103-7 receives external FHSS signal S2A' (transmitted from remote station 200). Signals S2A' and S3 have the same carrier frequencies. Signal S2A' is comprised of a sequence of phase shifted carriers corresponding to the carriers of signal S3 generated by synthesizer 103-4. Further, the sequence of carriers of signal S2A' are equal in frequency to the sequence of carriers of signal S3 generated by the synthesizer 103-4. Signal S2' and S3 are coupled to the inputs of phase detector 103-6 for phase comparison. Phase detector 103-6 generates a sequence of DC I/Q outputs corresponding to the phase and amplitude of the sequence of carriers of S2'. While shown as part of the RF circuitry, the phase detector 103-6 may be implemented in the processor 102, for example, using software.

Also shown in FIG. 5 is the remote station 200. Remote station 200 includes a receiver/discriminator 200-2, synthesizer 200-3, and power amplifier 200-1. The receiver/discriminator 200-2 receives FHSS signal S1A' (comprised of a sequence of carriers having frequencies $f_{r1}, f_{r2}, \ldots f_{rn}$) from the RF transceiver 103 of the base station 100 and recovers the modulation signal fm'. Modulation signal fm' is coupled to the input of synthesizer 200-3. Synthesizer 200-3 multiplies fm' by a sequence of integers to generate FHSS signal S2, which is comprised of a sequence of frequencies $f_{r1}, f_{r2}, \ldots f_{rn}$. In this example, N will be a sequence of integers from 4800–4960. Signal S2 is coupled to the input of power amplifier 200-1, amplified, and transmitted to receiver 103-7 of base station 100.

As shown in FIG. 5, modulated signal fm is transmitted from base station 100 to remote unit 200 using a frequency hopping scheme. For purposes of obtaining the distance measurement, the message content and method of modulation are academic (requiring only that phase coherency be maintained) and are dependent on the specific application and platform used. For example, if using the Bluetooth™ technology the method of modulation used would most likely be gaussian frequency shift keying. Other modulation techniques will be known to those skilled in the art and are within the scope of the present invention.

Once the signal S1' is received at the remote unit 200 by receiver 200-2, it is frequency discriminated to obtain a received version of original modulation signal $f_m'$. Modulation signal $f_m'$ contains the phase information of the received signal S1A'. Modulation signal fm can therefore be used to synchronize a voltage controlled oscillator (VCO) within the synthesizer 200-3. More specifically, modulation signal $f_m'$ can be used as a reference signal for the synthesizer 200-3 to generate FHSS signal S2, comprising carriers having frequencies ($f_{r1}, fr_2, \ldots f_{rn}$). To accomplish this, synthesizer 200-3 multiplies fm' (in this example, 0.5 MHZ) by a sequence of integers N (in this example, 4800→8960). Each of the frequencies of S2 is therefore phase coherent with modulation signal fm. S2 is amplified by power amplifier 200-1 to generate signal S2A and transmitted back to the base station 100.

At base station 100, FHSS signal S2A' is received by receiver 103-7 and amplified to produce FHSS signal S2'. The signal S2A' is the same frequency as S3 (generated by synthesizer 103-4), except for a difference in the phase angle due to the propagation distance experienced by signal S1A' and S2A'. Signal S2' is phase compared with the S3 by phase detector 103-6. The phase comparison may be performed by generating In-phase (I) and Quadrature (Q) DC signals and performing a simple arithmetic calculation to find the phase shift and amplitude. Alternatively, the I/Q data may be used directly, or a phase comparison technique different may be used. I/Q data is stored in memory 105 of the processor 102 (shown in FIG. 3). After I/Q data is collected for a sufficient number of adjacent carrier frequencies, CPU 104 executes a distance measurement algorithm that operates on the stored I/Q data to calculate the distance between the base station 100 and remote station 200.

Notably, in this embodiment, the carrier frequencies of S1A are different from the carrier frequencies comprising S2A. In some embodiments, the carrier frequencies of S1A and S2A may occupy different, non-overlapping frequency ranges. In other embodiments, the carrier frequencies of S1A and S2A may overlap. However, it is preferred that S1A and S2A are not transmitted with the same carrier frequency at the same time. Consequently, this embodiment is well suited for, but not limited to, full-duplex operation. Moreover, the full-duplex transmission scheme described herein need not transmit carrier frequencies in incrementing or decrementing order, and in practice, the sequential order of carrier frequency transmission may be quite random. In operation, it is only necessary that the base station and the remote station in this embodiment follow the same hopping sequence of carrier frequencies. However, a two-way frequency hopping scheme is not required. Many other transmission schemes are known and could take advantage of other variation of the full-duplex operation of this embodiment of the present invention.

In alternative embodiments, synthesizer 103-4 generates a FHSS signal having a sequence of carriers (S3) at different frequencies than those of S2A'. This requires that S2A' be frequency-converted by receiver 103-7 to the same frequency as the FHSS signal output from synthesizer 103-4. This frequency-conversion is necessary because of the requirement that the two inputs to phase detector 103-6 be at the same frequency for meaningful phase comparison. Generally, any transceiver arrangement that allows a phase detector to compare phases of equal frequency signals will suffice.

Figure 6:
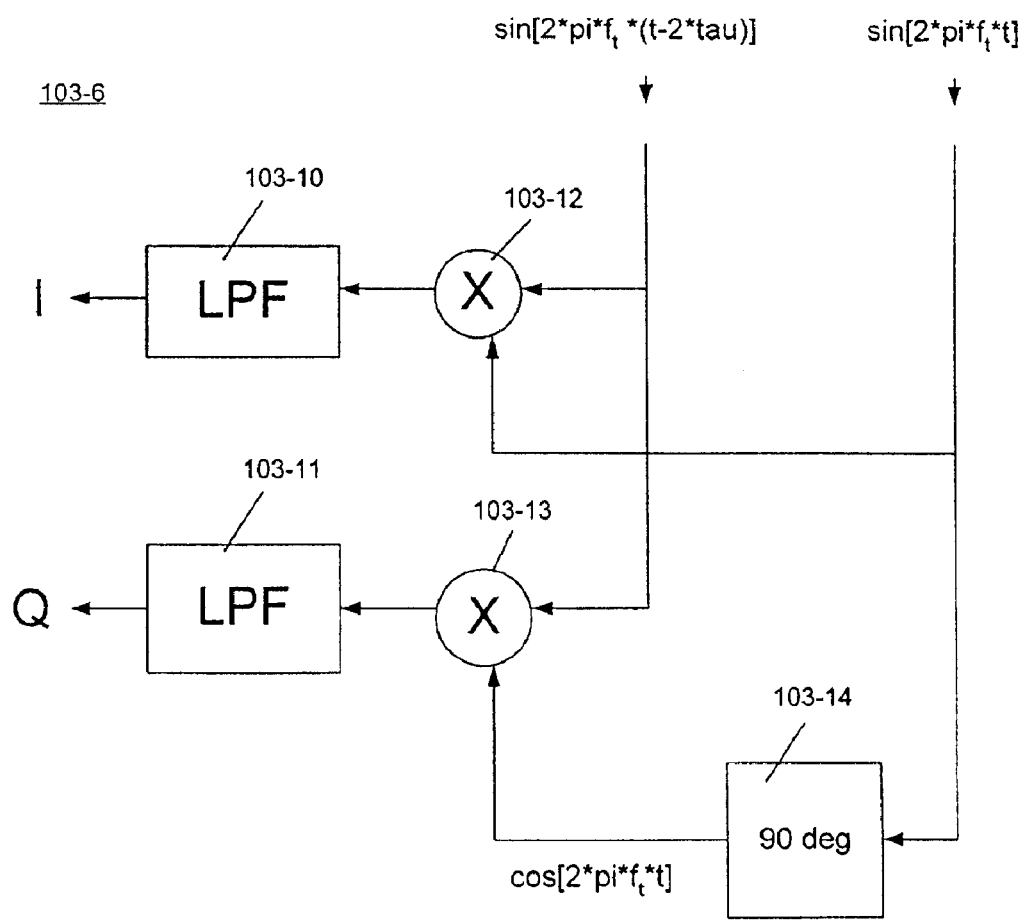
FIG. 6 is an illustrative functional block diagram of a phase detector in accordance with an embodiment of the present invention.

FIG. 6 is a detailed illustration of one example of phase detector 103-6. As shown, phase detector 103-6 includes a 90 degree phase shifter 103-14, RF mixers 103-12 and 103-13, and low pass filters (LPFs) 103-10 and 103-11. Mixer 103-12 receives input signal S3 ($\sin[2\pi f_r t]$) from the synthesizer 103-4 and input signal S2' ($A \sin[2\pi f_r (t-2\tau)]$) from receiver 103-7. Mixer 103-12 mixes these two signals and sends the result to low pass filter 103-10 to remove unwanted harmonics. Mixer 103-13 receives input signal S2' ($A \sin[2\pi f_r (t-2\tau)]$) from receiver 103-7 and S3∠90 ($\cos[2\pi f_r t]$) from the 90 degree phase shifter 103-14. The 90 degree phase shifter 103-14 receives as an input S3 ($\sin[2\pi f_r t]$) from synthesizer 103-14. Mixer 103-13 mixes these two signals and sends the result to low pass filter 103-11 to remove unwanted harmonics. The in-phase and quadrature signals I and Q are thereby output from low pass filters 103-10 and 103-11, respectively. The phase differences (I and Q components) are forwarded to the CPU 103 (shown in FIG. 3) for further processing, e.g., calculation of the multipath information and possibly the distance measurement.

The I and Q components are generated by mixing the received signal $A \sin[2\pi f_r (t-2\tau)]$ with the locally generated signal $\sin[2\pi f_r t]$ as illustrated in FIG. 6, where $\tau$ is the one-way time delay and A is the amplitude. Using the resulting I and Q components (stored in memory 105) to solve for $\tau$ yields:

$$Q/I = \tan[2\pi f_r * 2\tau]$$

$$\tau = \arctan(Q/I)/4\pi f_r$$

The Q and I values may be processed as discussed below to produce the multipath information.

Figure 7:
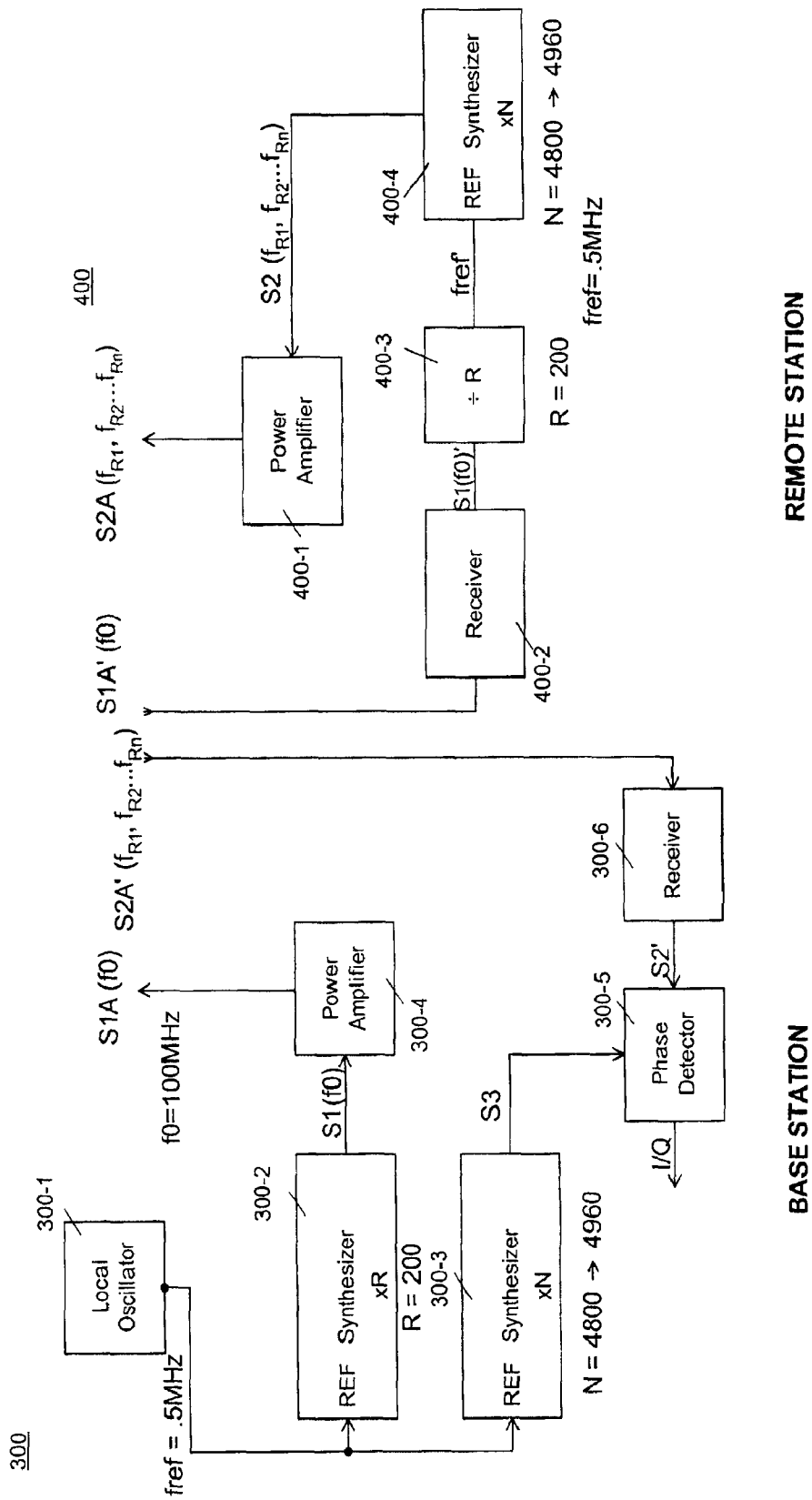
FIG. 7 is an illustrative functional block diagram of a base station and remote unit in accordance with an embodiment of the present invention.

FIG. 7 is a functional block diagram of a second embodiment of the present invention. This embodiment can operate either in half-duplex or in full-duplex modes. FIG. 7 illustrates circuitry that may be included in the RF transceiver portion of base station 300 and the remote station 400. As shown, the base station 300 includes a local oscillator 300-1, synthesizer 300-2, synthesizer 300-3, power amplifier 300-4, phase detector 300-5, and receiver 300-6. Local oscillator 300-1 generates a system clock, or reference signal fref, which is coupled to the reference inputs of synthesizers 300-2 and 300-3. In this example, fref=0.5 MHz.

Synthesizer 300-2 generates a single carrier signal S1(f0), which is coupled to the input of power amplifier 103-5. S1(f0) is a multiple of the reference frequency fref. In this example, synthesizer 300-2 multiplies fref by an integer value R, where R=200. Power amplifier 300-4 amplifies S1(f0) and produces amplified signal S1A(f0), which may be, for example, 1 MHz. Signal S1A(f0) is propagated over distance D to the remote unit 400. Synthesizer 300-3 generates an FHSS signal S3, which is comprised of a sequence of carriers at different frequencies. Each carrier is a multiple of the reference frequency fref. In this example, fref is multiplied by a sequence of integers N, where N varies between 4800 and 4960. As previously mentioned, N need not vary in ascending or descending order.

Receiver 300-6 receives external FHSS signal S2A' (transmitted from remote station 200) to produce return signal S2'. Signal S2' is comprised of a sequence of phase shifted carriers corresponding to FHSS signal S3 generated by synthesizer 300-3. Further, the sequence of carriers of FHSS signal S2' are equal in frequency to the sequence of carriers of signal S3 generated by the synthesizer 300-3. Signals S2' and S3 are coupled to the inputs of phase detector 300-5 for phase comparison. Phase detector 300-5 generates a sequence of DC I/Q outputs corresponding to the carriers of S2' and S3. The internal details of phase detector 300-5 may be the same as described in the previous embodiment.

Also shown in FIG. 7 is the remote station 400. Remote station 400 includes a receiver 400-2, divider 400-3, synthesizer 400-4, and power amplifier 400-1. The receiver 400-2 receives single carrier signal S1A'(f0) from the base station 300 to produce S1'(f0). Divider 400-3 divides signal S1'(f0) to produce reference signal fref. For purposes of example, R=200. Reference signal fref is coupled to the input of synthesizer 400-4. Synthesizer 400-4 multiplies fref by a sequence of integers N to generate FHSS signal S2, which is comprised of a sequence of frequencies $f_{r1}, f_{r2}, \ldots f_{rn}$. In this example, N is a sequence of integers between 4800 and 4960. Signal S2 is coupled to the input of power amplifier 400-1, amplified, and transmitted to receiver 300-6 in the RF transceiver 300 of the base station.

As shown in FIG. 7, single carrier signal S1A(f0) is transmitted from transceiver 300 to remote station 200. As will be described, this embodiment does not require that a spread spectrum signal be used for the outgoing transmission from the base station. Further, the invention could be modified to work with a modulated carrier transmitted from the base station, although modulation is not a requirement for this embodiment.

As shown in FIG. 7, signal S1A' is received at the remote unit 400 by receiver 400-2 to produce single frequency signal S1(f0)'. S1(f0)' is then used by the divider to generate a reference signal fref'. Reference signal fref' is used to synchronize a VCO in synthesizer 400-4 to generate S2 which is comprised of a sequence of carriers ($f_{r1}, f_{r2}, \ldots f_{rn}$). FHSS signal S2 is amplified by power amplifier 400-1 to generate signal S2A and transmitted back to the RF transceiver 300 of the base station.

At the base station transceiver 300, FHSS signal S2A' is received by receiver 103-7 and amplified to produce FHSS signal S2'. Signal S2' is phase compared with the signal S3 originally generated by synthesizer 300-3. As in the previous embodiment, phase comparison is performed by generating In-phase (I) and Quadrature (Q) DC signals and performing a simple arithmetic calculation to find the phase shift and signal amplitude. I/Q data is stored in memory 105 of the processor 102 (shown in FIG. 3). After I/Q data is collected for a sufficient number of adjacent carrier frequencies, CPU 104 executes the distance measurement algorithm described in the previous embodiment. Notably, in the second embodiment, the carrier frequency of S1A(f0) was different from the frequencies comprising S2A. Consequently, the second embodiment is well suited for, but not limited to, full duplex operation. Further, as mentioned before, any transceiver implementation that provides for phase detection of equal frequency signals is sufficient.

FIG. 8 is a function block diagram of a further embodiment of the present invention. FIG. 8 illustrates circuitry that may be included in the base station transceiver 500 and the remote station 600. As shown, the base station transceiver 500 includes a local oscillator 500-1, synthesizer 500-2, power amplifier 500-3, phase detector 500-4, and receiver 500-5. Local oscillator 500-1 generates a system clock, or reference frequency fref, which is coupled to the reference input of synthesizer 500-2. N this example, fref is set to 0.5 MHz.

Synthesizer 300-2 generates a frequency hopping spread spectrum (FHSS) signal S1, which is comprised of a sequence of carriers at different frequencies. Each carrier is a multiple of the reference frequency fref. In this example, the multiplication factor N is used by synthesizer 500-2, and is a sequence of values between 4800 and 4960. Signal S1 is coupled to the input of power amplifier 500-3. Power amplifier 500-3 amplifies signal S1 and produces amplified FHSS signal S1A. Signal S1A is propagated over distance D to the remote unit 600.

Receiver 500-5 receives external FHSS signal S2A' (transmitted from remote station 600). Signal S2A' is comprised of a sequence of phase shifted carriers corresponding to the carriers of signal S1 generated by synthesizer 500-2. Further, the sequence of carriers of signal FHSS S2A' are equal in frequency to the sequence of carriers of signal S1 generated by the synthesizer 500-2. Signal S2' and S1 are coupled to the inputs of phase detector 500-4 for phase comparison. Phase detector 500-4 generates, for example, a sequence of DC I/Q outputs corresponding to the carriers of S2'.

Also shown in FIG. 8 is the remote station 600. Remote station 600 includes a receiver 600-1, divider 600-2, synthesizer 600-3, and power amplifier 600-4. The receiver 600-1 receives FHSS signal S1A' (comprised of a sequence of carriers having frequencies $f_{r1}, f_{r2}, \ldots f_{rn}$) from the base station RF transceiver 500 and generates signal S1'. Divider 600-2 divides S1' by a factor R to generate reference signals fref'. For purposes of example, let R sequence through the range of integers 4800→4960. Reference signal fref is coupled to the input of synthesizer 600-3. Synthesizer 600-3 multiplies fref' by the sequence R to generate FHSS signal S2, which is comprised of a sequence of frequencies $f_{r1}$, $f_{r2}, \ldots f_{rn}$. FHSS signal S2 is coupled to the input of power amplifier 600-1, amplified, and transmitted to receiver 500-5 of base station transceiver 500.

Figure 9:
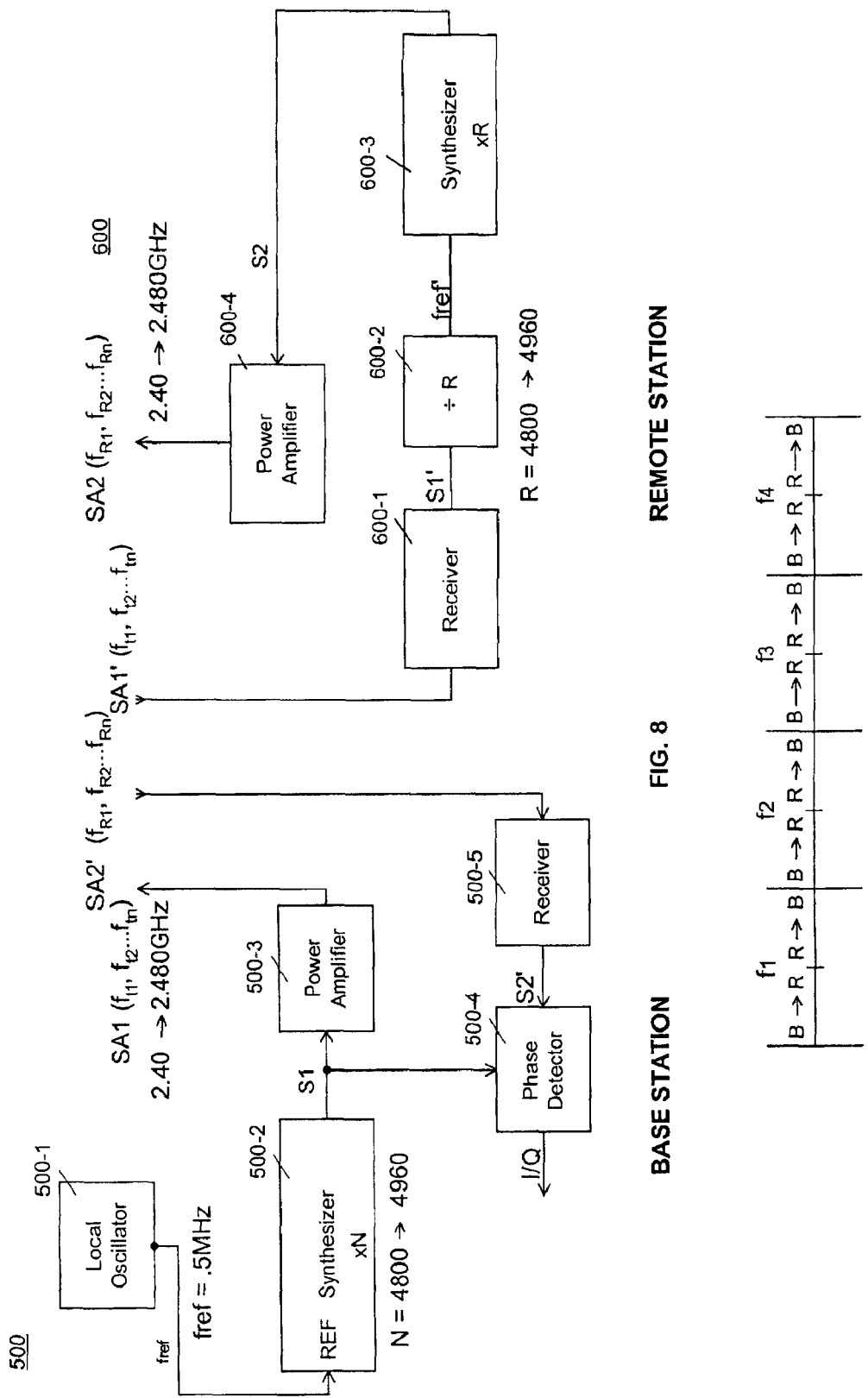
FIG. 9 is an exemplary timing diagram showing one possible timing sequence of the transmission between a base station and a remote station of FIG. 8.

The operation of this embodiment will be described with reference to FIGS. 8–9. As shown in FIG. 8, FHSS signal S1A is transmitted from base station transceiver 500 to remote unit 600. As shown in the timing diagram of FIG. 9, the signal S1A is comprised of a sequence of carriers f1, f2, f3 ... fn. To implement a half-duplex system, where the return transmit carriers have the same frequency as the base station transmit carriers, transmit and receive operations must be time multiplexed. In this example, the carrier of S1A having a frequency of f0 is transmitted by the base station to the remote station during a first time interval (B→R). Subsequently, the same phase-shifter carrier is received by the base station during a second time interval (R→B). Next, f1 is transmitted and received during alternating time intervals (B→R) and (R→B). In this way, the base station and remote station can utilize the same transmit band without interference.

The half-duplex transmission scheme described herein need not transmit carrier frequencies in incrementing order, and in practice, the sequential order of carrier frequency transmission may be quite random. In operation, it is only necessary that the base station and the remote station follow the same hopping sequence of carrier frequencies. Many other transmission schemes are known and could take advantage of other variation of the half-duplex operation of this embodiment of the present invention.

As shown in FIG. 8, the signal S1A' is received at the remote unit 600 by receiver 600-1 and divided down by divider 600-2 to generate the reference frequency $f_{ref}'$. Divider 600-2 may include a phase locked loop for generating fref'. The phase locked loop contains a VCO which is locked by the input signal S1'. In this example, the dividing factor R is selected from a sequence of integers ranging from 4800 to 4960. Each integer is selected according to the given transmit frequency. After the transmission of signal S1A(f0) from the transceiver 500 of the base station ceases, divider 600-2 maintains the control voltage on the VCO such that the reference signal fref continues with minimal frequency and phase drift. One or more techniques to maintain a stable reference signal after the input locking signal ceases to exist can be implemented, for example, as suggested in related U.S. Application No. 09/759,602, filed concurrently herewith and expressly incorporated by reference herein.

Reference signal $f_{ref}'$ contains the phase information of the received signal S1'. It can therefore be used to synchronize a VCO within the synthesizer 600-3. More specifically, the signal $f_{ref}'$ is used as a reference signal for the synthesizer 600-3 to generate signal S2 comprising carriers having frequencies ($f_{r1}, f_{r2}, \ldots f_{rn}$). Each of the frequencies of S2 are phase coherent with reference signal fref'. After transmission of S1 by the base station transceiver 500 is complete, return signal S2 is amplified by power amplifier 600-1 to generate signal S2A and transmitted back to the base station transceiver 500.

At base station 500, FHSS signal S2A' is received by receiver 500-5 and amplified to produce signal S2'. Signal S2' is phase compared with the S1 originally generated signals by synthesizer 500-2. The phase comparison may be performed by the methods described above.

The multipath functionality implemented by the base station 100 will now be discussed. Most wireless communication links 15 are exposed to the multipath phenomenon. As discussed above, this means that the RF signal received by a receiver is composed of many signal components traveling in different paths caused by reflections and diffraction from earth and surrounding objects. Each signal component has a different propagation delay. It is important in some applications (such as distance measurements) to know how many significant paths exist, their position, and relative strength. In particular, in the case of a distance measuring system, it is the propagation time for the direct path that is desired.

In accordance with the present invention, information is gathered on different frequencies that have the same or substantially the same multipath characteristics. It is assumed that if the transmitted signals are close enough in frequency, the transmitted signals will travel in the same or substantially the same (i.e., within tolerance) set of multipaths. In the received signals, a periodic relationship will exist between the received amplitude and the received frequency. The relationship is periodic in frequency, with the period dependent on relative amplitude and delays of the involved echoes.

The base station 100 may collect and store amplitude and differential phase shift information corresponding to each of the received signals S2A', for example, as discussed above, during one or more hopping cycles. The data may be stored in memory included in the processor 102. For example, the memory 105 may store the maximum received amplitude for each received frequency or the root-mean-square (RMS) amplitude for each received frequency. The base station 100 and remote unit 200 may perform multiple frequency-hopping cycles. The data from the multiple cycles may be averaged by the processor 102 to improve noise immunity. Next, the stored data may be processed by a hardware or software-implemented inverse Fast Fourier Transform (IFFT) algorithm. The resulting time-domain data indicates the location (time delay) and relative amplitude of the echoes composing the received signal. In distance measurement systems this knowledge is sufficient to distinguish the direct path from the combined signal, for example, by selecting the first peak signal in the time domain (which corresponds to the shortest distance between the base station and the remote unit) and ignoring other components. The resolution and maximum detectable delay range for this method depends on the number of usable frequencies, their spacing, and their total span. For the Bluetooth technology, the method is effective in the range of about 4 to about 150 meters.

The mathematical principles underlying the present invention will now be discussed. Details of a phase-slope distance measurement methodology, which may be used in connection with the present invention, are discussed in U.S. Application No. 09/759,601, entitled "Accurate Distance Measurement Using Wireless Techniques", filed concurrently herewith and expressly incorporated by reference herein. In the phase-slope method, measurement of propagation delay is based on the principal that the relative phase angle of the received signal is a linear function of frequency. That is, if phase delay is plotted as a function of frequency, the resulting graph is theoretically a straight line. The slope of the line is directly proportional to the propagation delay and thus to the distance between transmitter and receiver. As noted above, the echo signals travel over longer paths than the direct path signal. At the receiver, the direct path signal and the echo signals combine as vectors. If the combined signal is used to calculate distance, the calculated distance is greater than the true distance. However, the echoes distort the linear 'phase vs. frequency' curve, and this distortion can provide information as to the existence of multiple paths.

In addition, the distance correction information can be determined from the amplitude vs. frequency profile of the received signal. When direct path and echo signals combine as vectors, the resultant amplitude, A, for two signals is:

$$A(f) = \sqrt{a1^2 + a2^2 + 2 \cdot a1 \cdot a2 \cdot \cos \alpha(f)}$$

where a1 and a2 are the amplitudes of the direct path signal and the echo signal and $\alpha$ is their phase difference. The phase difference $\alpha$ is a function of frequency, which equals the difference in wavelength expressed in radians between the direct path and the echo path.

From the above expression, the relative strengths of the direct signal and an echo from the amplitude ripple A(f) can be determined as follows. Let f1 equal the frequency where $\alpha=0$ and A is at its maximum, and let f2 equal the frequency where $\alpha=\pi$ and A is at its minimum.

From the above equation for A(f) we can derive the following two equations with two unknowns (when a1>a2):

$$A_{min} = a1 - a2 \text{ and}$$

$$A_{max} = a1 + a2$$

Solving for a1/a2:

$$a1/a2 = (A_{max} - A_{min})/(A_{max} + A_{min})$$

The inverse of the period of the ripple is the delay time ($\Delta t$) of the echo. To show this we first write the expression for $\alpha(f)$:

$$\alpha(f) = \Delta t * f * 2\pi$$

The change in $\alpha$ between f1 and f2 is $\pi$, so:

$$\alpha(f2) - \alpha(f1) = \Delta t(f2-f1)2\pi = \pi$$

$$\Delta t = 1/[2(f2-f1)]$$

The period of the ripple is 2(f2−f1) so we have proved the above assertion. These two data, the relative echo strength and the echo delay, plus the apparent propagation delay that may be found using the phase-slope method, is may be used to calculate the true propagation delay, as will be demonstrated.

In practice, the amplitude and phase data can be collected by one wireless device 110 based on RF signals received from another wireless device 110. The following methodology is used to determine the direct path time delay from the amplitude and phase information (or their Cartesian format) of the received signals.

Figure 10C:
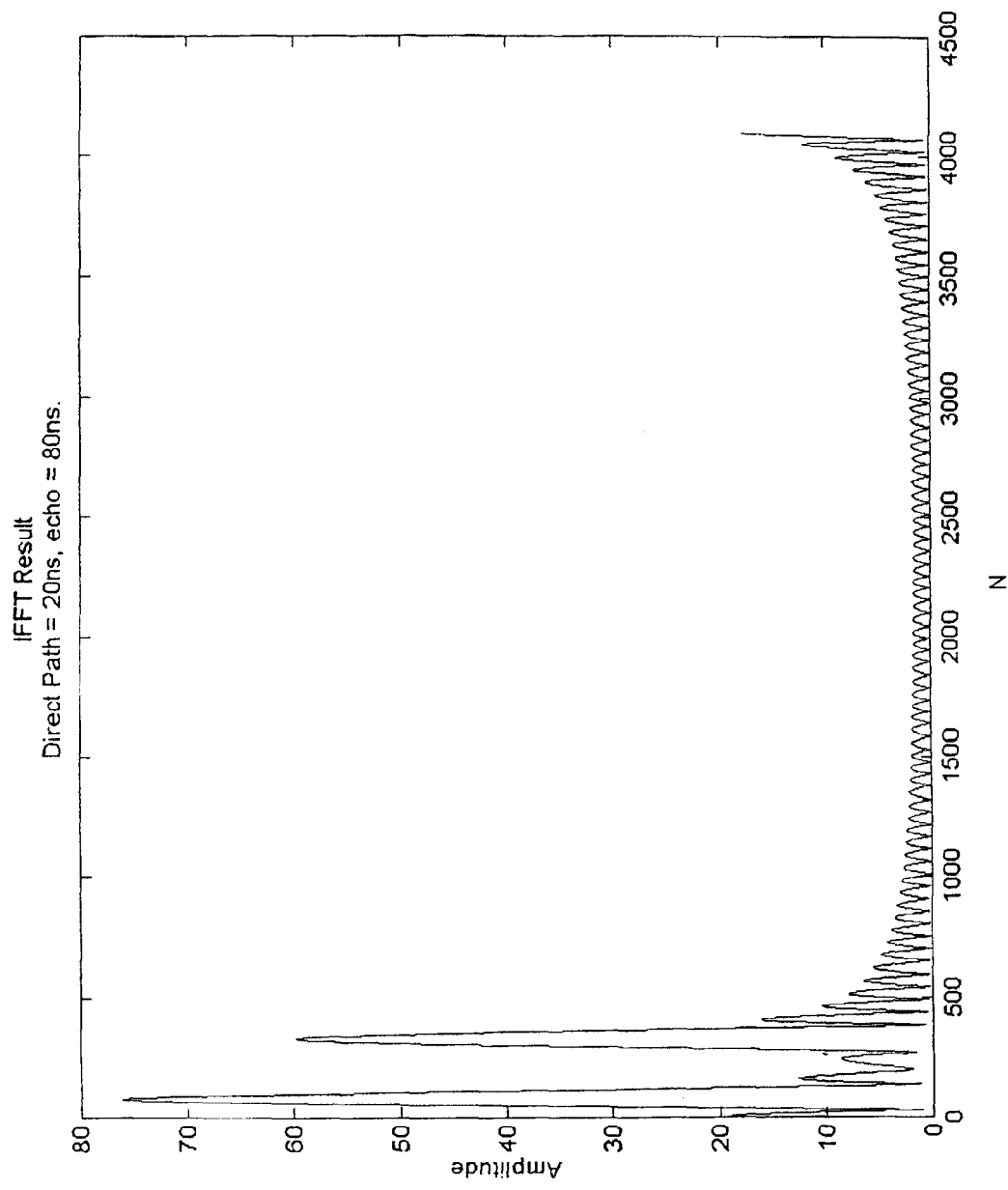
FIG. 10C provides a graph of the inverse Fast Fourier Transform (IFFT) of the frequency, phase, and amplitude information of FIGS. 10A and 10B.

First, the wireless device 110 (acting as a base station 100) collects amplitude and phase (for example, 'In-phase' and 'Quadrature-phase' components) data for received frequencies, for example, as described above in connection with FIGS. 5–9. By way of example, FIGS. 10A–10E illustrates an example in which the received signals include a direct path component having a 20 ns propagation delay and an echo component having an 80 ns propagation delay. FIGS. 11A–11E illustrate an example in which the received signals include a direct path component having a 20 ns propagation delay and echo components having 80 ns and 120 ns propagation delays, respectively. FIGS. 10A and 11A illustrate examples of the received amplitude and frequency data plotted as a graph to facilitate an understanding of this aspect of the invention. Similarly, FIGS. 10B and 11B illustrate examples of the received phase and frequency data plotted as a graph. Of course, in the operation of the wireless device 110, the amplitude, phase, and/or frequency data may be stored in memory and processed as a set of values or other convenient format(s) to facilitate storage and/or processing.

For example, Table 1 (below) provides a representation of the amplitude and phase data of FIGS. 10A and 10B in Cartesian format (I and Q). Table 2 (also below) provides a representation of the amplitude and phase data of FIGS. 11A and 11B in Cartesian format (I and Q).

TABLE 1

Direct Path and 20 ns Echo

| Freq. (MHz) | I | Q |
|---|---|---|
| 2402 | 1.4474770 | 1.7225736 |
| 2403 | 0.4700697 | 1.7829565 |
| 2404 | 0.2580085 | 1.3058819 |
| 2405 | 0.4854102 | 0.5877853 |
| 2406 | 0.2146282 | −0.0010161 |
| 2407 | 0.3222642 | −0.1994487 |
| 2408 | 0.8007541 | 0.0289654 |
| 2409 | 0.9769196 | 0.5044002 |
| 2410 | 0.8034442 | 0.9510565 |
| 2411 | 0.4299328 | 1.1585112 |
| 2412 | 0.0938359 | 1.0935745 |
| 2413 | 0.0317452 | 0.9024790 |
| 2414 | 0.0551702 | 0.8060633 |
| 2415 | 0.1854102 | 0.9510565 |
| 2416 | 0.1253610 | 1.3052539 |
| 2417 | 0.2708995 | 1.6596904 |
| 2418 | 0.9525837 | 1.7404752 |
| 2419 | 1.6725654 | 1.3701103 |
| 2420 | 2.1034442 | 0.5877853 |
| 2421 | 2.0106219 | −0.3423746 |
| 2422 | 1.3894833 | −1.0467074 |

TABLE 1-continued

Direct Path and 20 ns Echo

| Freq. (MHz) | I | Q |
|---|---|---|
| 2423 | 0.4896893 | −1.2251938 |
| 2424 | 0.2921055 | −0.8077074 |
| 2425 | 0.6000000 | −0.0000000 |
| 2426 | 0.2921055 | 0.8077074 |
| 2427 | 0.4896893 | 1.2251938 |
| 2428 | 1.3894833 | 1.0467074 |
| 2429 | 2.0106219 | 0.3423746 |
| 2430 | 2.1034442 | −0.5877853 |
| 2431 | 1.6725654 | −1.3701103 |
| 2432 | 0.9525837 | −1.7404752 |
| 2433 | 0.2708995 | −1.6596904 |
| 2434 | 0.1253610 | −1.3052539 |
| 2435 | 0.1854102 | −0.9510565 |
| 2436 | 0.0551702 | −0.8060633 |
| 2437 | 0.0317452 | −0.9024790 |
| 2438 | 0.0938359 | −1.0935745 |
| 2439 | 0.4299328 | −1.1585112 |
| 2440 | 0.8034442 | −0.9510565 |
| 2441 | 0.9769196 | −0.5044002 |
| 2442 | 0.8007541 | −0.0289654 |
| 2443 | 0.3222642 | 0.1994487 |
| 2444 | 0.2146282 | 0.0010161 |
| 2445 | 0.4854102 | −0.5877853 |
| 2446 | 0.2580085 | −1.3058819 |
| 2447 | 0.4700697 | −1.7829565 |
| 2448 | 1.4474770 | −1.7225736 |
| 2449 | 2.2763349 | −1.0583739 |
| 2450 | 2.6000000 | −0.0000000 |
| 2451 | 2.2763349 | 1.0583739 |
| 2452 | 1.4474770 | 1.7225736 |
| 2453 | 0.4700697 | 1.7829565 |
| 2454 | 0.2580085 | 1.3058819 |
| 2455 | 0.4854102 | 0.5877853 |
| 2456 | 0.2146282 | −0.0010161 |
| 2457 | 0.3222642 | −0.1994487 |
| 2458 | 0.8007541 | 0.0289654 |
| 2459 | 0.9769196 | 0.5044002 |
| 2460 | 0.8034442 | 0.9510565 |
| 2461 | 0.4299328 | 1.1585112 |
| 2462 | 0.0938359 | 1.0935745 |
| 2463 | 0.0317452 | 0.9024790 |
| 2464 | 0.0551702 | 0.8060633 |
| 2465 | 0.1854102 | 0.9510565 |
| 2466 | 0.1253610 | 1.3052539 |
| 2467 | 0.2708995 | 1.6596904 |
| 2468 | 0.9525837 | 1.7404752 |
| 2469 | 1.6725654 | 1.3701103 |
| 2470 | 2.1034442 | 0.5877853 |
| 2471 | 2.0106219 | −0.3423746 |
| 2472 | 1.3894833 | −1.0467074 |
| 2473 | 0.4896893 | −1.2251938 |
| 2474 | 0.2921055 | −0.8077074 |
| 2475 | 0.6000000 | −0.0000000 |
| 2476 | 0.2921055 | 0.8077074 |
| 2477 | 0.4896893 | 1.2251938 |
| 2478 | 1.3894833 | 1.0467074 |
| 2479 | 2.0106219 | 0.3423746 |
| 2480 | 2.1034442 | −0.5877853 |

TABLE 2

Direct Path, 20 ns Echo and 80 ns Echo:

| Freq. (MHz) | I | Q |
|---|---|---|
| 2402 | 1.3972446 | 0.9241522 |
| 2403 | 0.9800089 | 1.1665459 |
| 2404 | 0.5356833 | 1.2056153 |
| 2405 | 0.1618034 | 1.0580135 |
| 2406 | −0.0647231 | 0.7848137 |
| 2407 | −0.1063972 | 0.4760136 |
| 2408 | 0.0258876 | 0.2279173 |
| 2409 | 0.2758742 | 0.1189973 |
| 2410 | 0.5562306 | 0.1902113 |
| 2411 | 0.7705562 | 0.4346496 |
| 2412 | 0.8376571 | 0.7990748 |
| 2413 | 0.7120760 | 1.1969786 |
| 2414 | 0.3957936 | 1.5299249 |
| 2415 | −0.0618034 | 1.7119017 |
| 2416 | −0.5756843 | 1.6906569 |
| 2417 | −1.0457660 | 1.4607385 |
| 2418 | −1.3812452 | 1.0650129 |
| 2419 | −1.5226604 | 0.5842805 |
| 2420 | −1.4562306 | 0.1175571 |
| 2421 | −1.2169301 | −0.2421080 |
| 2422 | −0.8795441 | −0.4302968 |
| 2423 | −0.5399217 | −0.4267725 |
| 2424 | −0.2910694 | −0.2600697 |
| 2425 | −0.2000000 | −0.0000000 |
| 2426 | −0.2910694 | 0.2600697 |
| 2427 | −0.5399217 | 0.4267725 |
| 2428 | −0.8795441 | 0.4302968 |
| 2429 | −1.2169301 | 0.2421080 |
| 2430 | −1.4562306 | −0.1175571 |
| 2431 | −1.5226604 | −0.5842805 |
| 2432 | −1.3812452 | −1.0650129 |
| 2433 | −1.0457660 | −1.4607385 |
| 2434 | −0.5756843 | −1.6906569 |
| 2435 | −0.0618034 | −1.7119017 |
| 2436 | 0.3957936 | −1.5299249 |
| 2437 | 0.7120760 | −1.1969786 |
| 2438 | 0.8376571 | −0.7990748 |
| 2439 | 0.7705562 | −0.4346496 |
| 2440 | 0.5562306 | −0.1902113 |
| 2441 | 0.2758742 | −0.1189973 |
| 2442 | 0.0258876 | −0.2279173 |
| 2443 | −0.1063972 | −0.4760136 |
| 2444 | −0.0647231 | −0.7848137 |
| 2445 | 0.1618034 | −1.0580135 |
| 2446 | 0.5356833 | −1.2056153 |
| 2447 | 0.9800089 | −1.1665459 |
| 2448 | 1.3972446 | −0.9241522 |
| 2449 | 1.6931600 | −0.5107362 |
| 2450 | 1.8000000 | 0.0000000 |
| 2451 | 1.6931600 | 0.5107362 |
| 2452 | 1.3972446 | 0.9241522 |
| 2453 | 0.9800089 | 1.1665459 |
| 2454 | 0.5356833 | 1.2056153 |
| 2455 | 0.1618034 | 1.0580135 |
| 2456 | −0.0647231 | 0.7848137 |
| 2457 | −0.1063972 | 0.4760136 |
| 2458 | 0.0258876 | 0.2279173 |
| 2459 | 0.2758742 | 0.1189973 |
| 2460 | 0.5562306 | 0.1902113 |
| 2461 | 0.7705562 | 0.4346496 |
| 2462 | 0.8376571 | 0.7990748 |
| 2463 | 0.7120760 | 1.1969786 |
| 2464 | 0.3957936 | 1.5299249 |
| 2465 | −0.0618034 | 1.7119017 |
| 2466 | −0.5756843 | 1.6906569 |
| 2467 | −1.0457660 | 1.4607385 |
| 2468 | −1.3812452 | 1.0650129 |
| 2469 | −1.5226604 | 0.5842805 |
| 2470 | −1.4562306 | 0.1175571 |
| 2471 | −1.2169301 | −0.2421080 |
| 2472 | −0.8795441 | −0.4302968 |
| 2473 | −0.5399217 | −0.4267725 |
| 2474 | −0.2910694 | −0.2600697 |

TABLE 2-continued

Direct Path, 20 ns Echo and 80 ns Echo:

| Freq. (MHz) | I | Q |
|---|---|---|
| 2475 | −0.2000000 | 0.0000000 |
| 2476 | −0.2910694 | 0.2600697 |
| 2477 | −0.5399217 | 0.4267725 |
| 2478 | −0.8795441 | 0.4302968 |
| 2479 | −1.2169301 | 0.2421080 |
| 2480 | −1.4562306 | −0.1175571 |

Next, time domain data can be obtained from the amplitude, phase, and frequency data. For example, an inverse Fast Fourier Transform (IFFT) may be used. Of course, other transform algorithms may be used as well. In the IFFT case, sampling is done in the frequency domain and transformed into the time domain. FIG. 10C illustrates curves that reflect the various transmission paths obtained from an IFFT of the information of FIGS. 10A and 10B. FIG. 11C illustrates the curves that reflect the various transmission paths obtained from an IFFT of the information of FIGS. 11A and 11B. We can clearly see that each of the transmission paths produces a single peak in the time domain. The relative position of the peak correlates to the propagation delay of the path it represents.

Next, the path delay corresponding to the first significant peak is determined. This may be done using a peak search algorithm to distinguish the peaks out of the ripple and select the first peak. For example, the peak search algorithm may be implemented simply by setting values below a particular threshold to zero. The first peak may be identified by the first data points above the predetermined threshold. For purposes other than distance measurements, the position of other peaks may be of interest as well. The selected peak may be accurately located on the time scale, for example, by translating the points on the X-axis into time, using the known ratio between the total number of sampling points (4096 in our examples) and the maximum measurable path delay ($1/[2*\Delta f]$, where $\Delta f$ is the sampling frequency spacing, in our case $\Delta f=1$ MHz and maximum measurable path delay= 500 ns). Of course, the x-axis may be scaled so that the result of the IFFT produces actual time values.

Figure 10D:
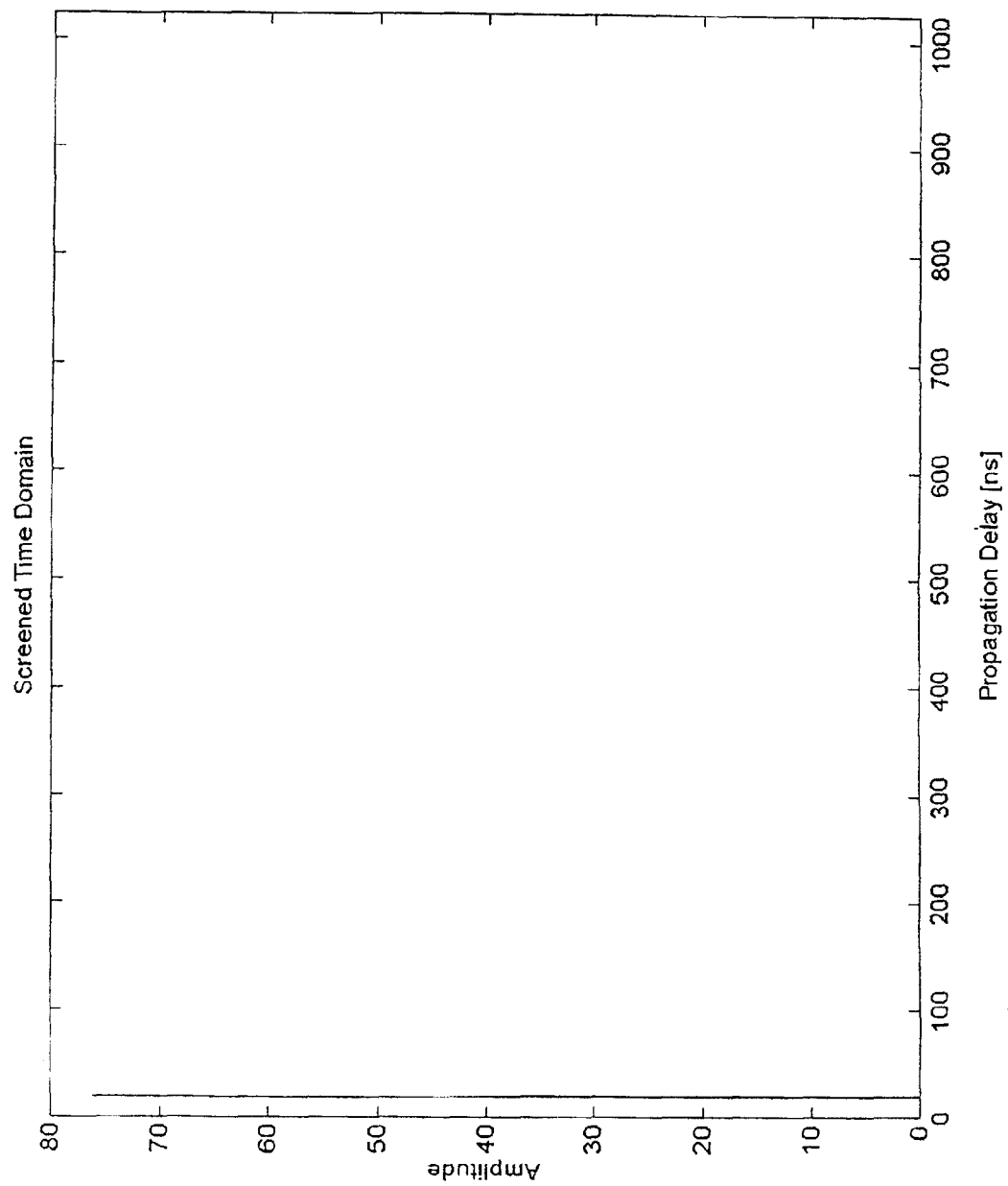
FIG. 10D provides a graph of the direct path propagation delay derived from the information of FIG. 10C.
Figure 10E:
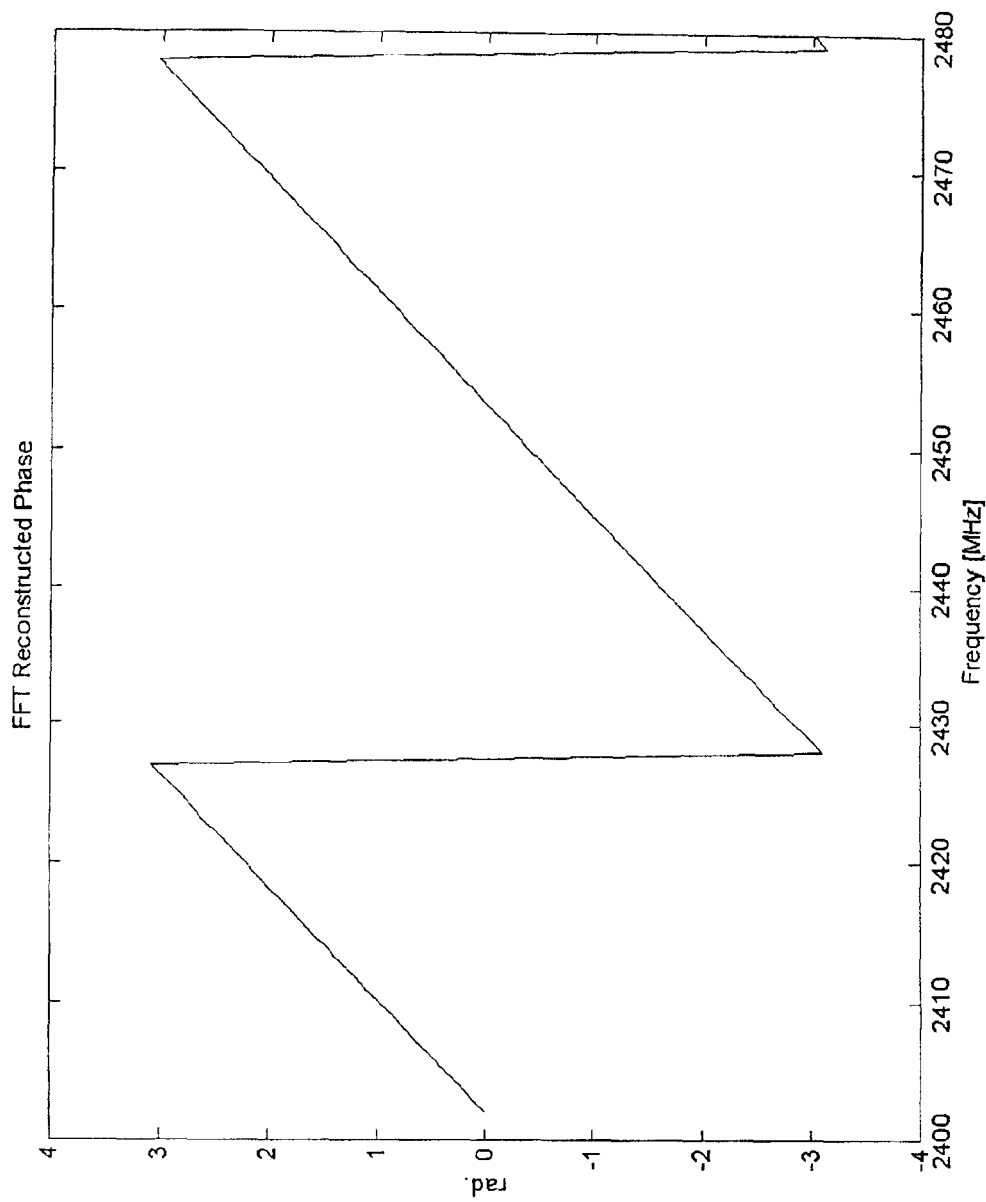
FIG. 10E provides a graph of the Fast Fourier Transform reconstructed phase of the information of FIG. 10C.
Figure 11C:
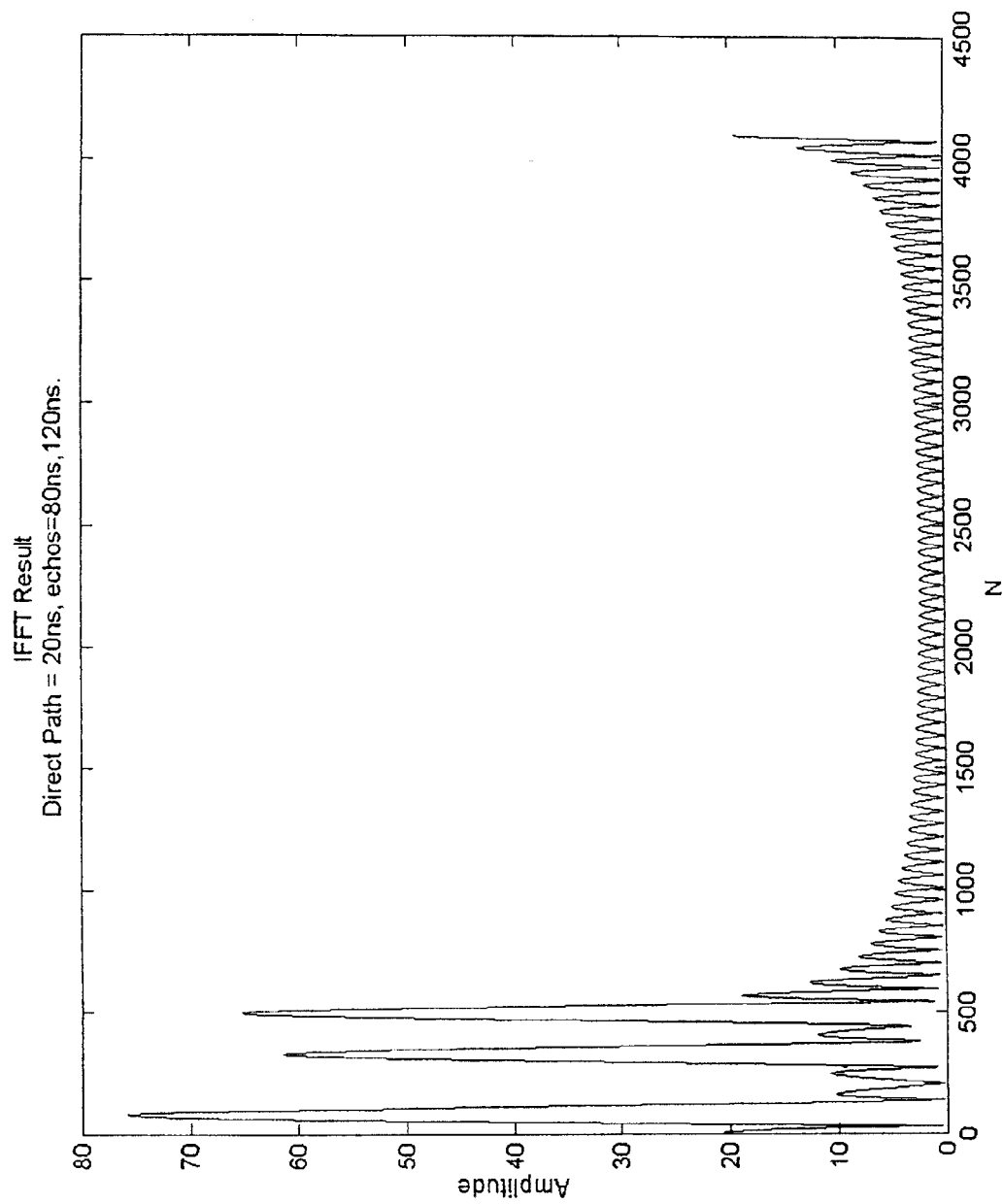
FIG. 11C provides a graph of the inverse Fast Fourier Transform (IFFT) of the frequency, phase, and amplitude information of FIGS. 11A and 11B.
Figure 11D:
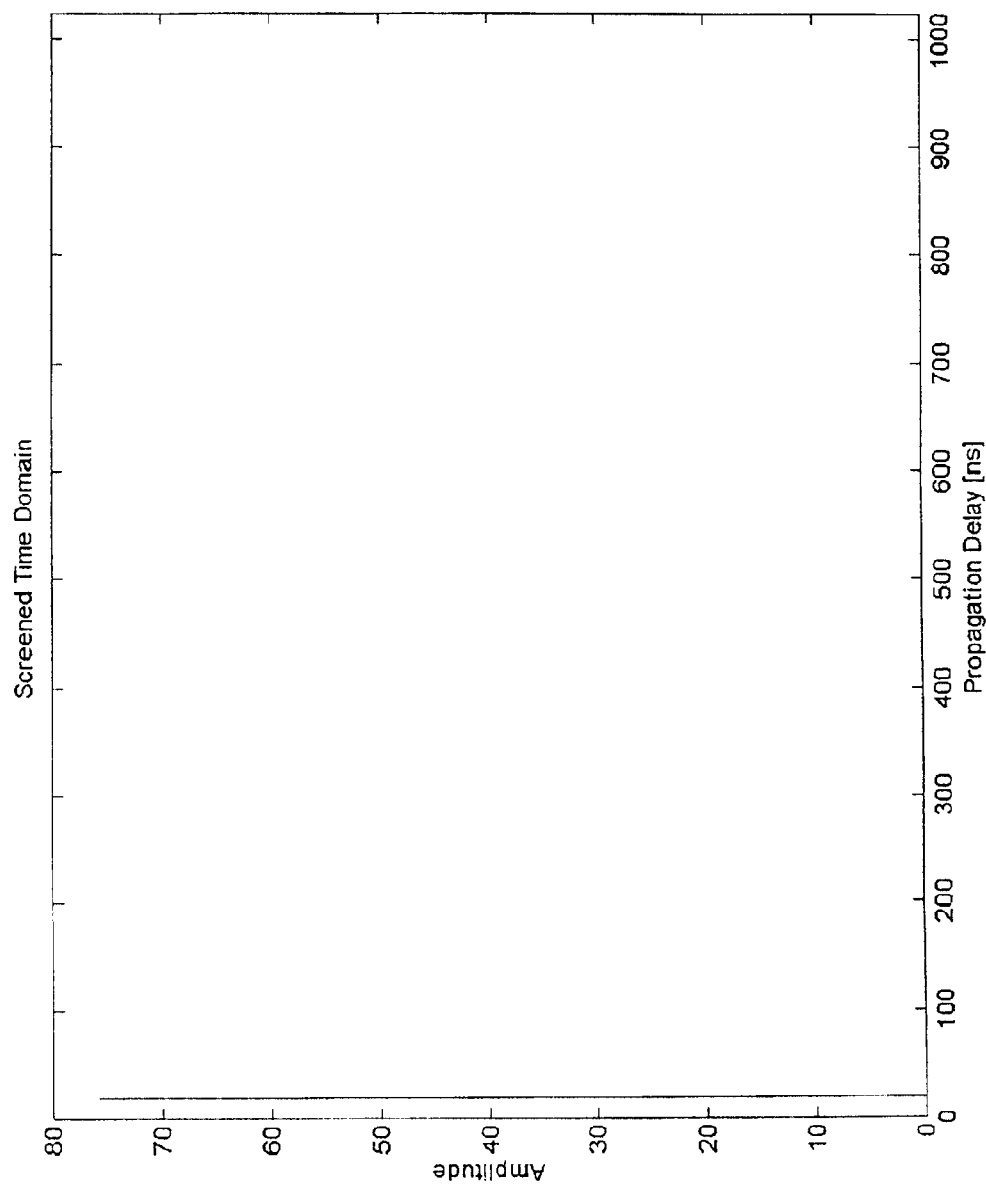
FIG. 11D provides a graph of the direct path propagation delay derived from the information of FIG. 11C.
Figure 11E:
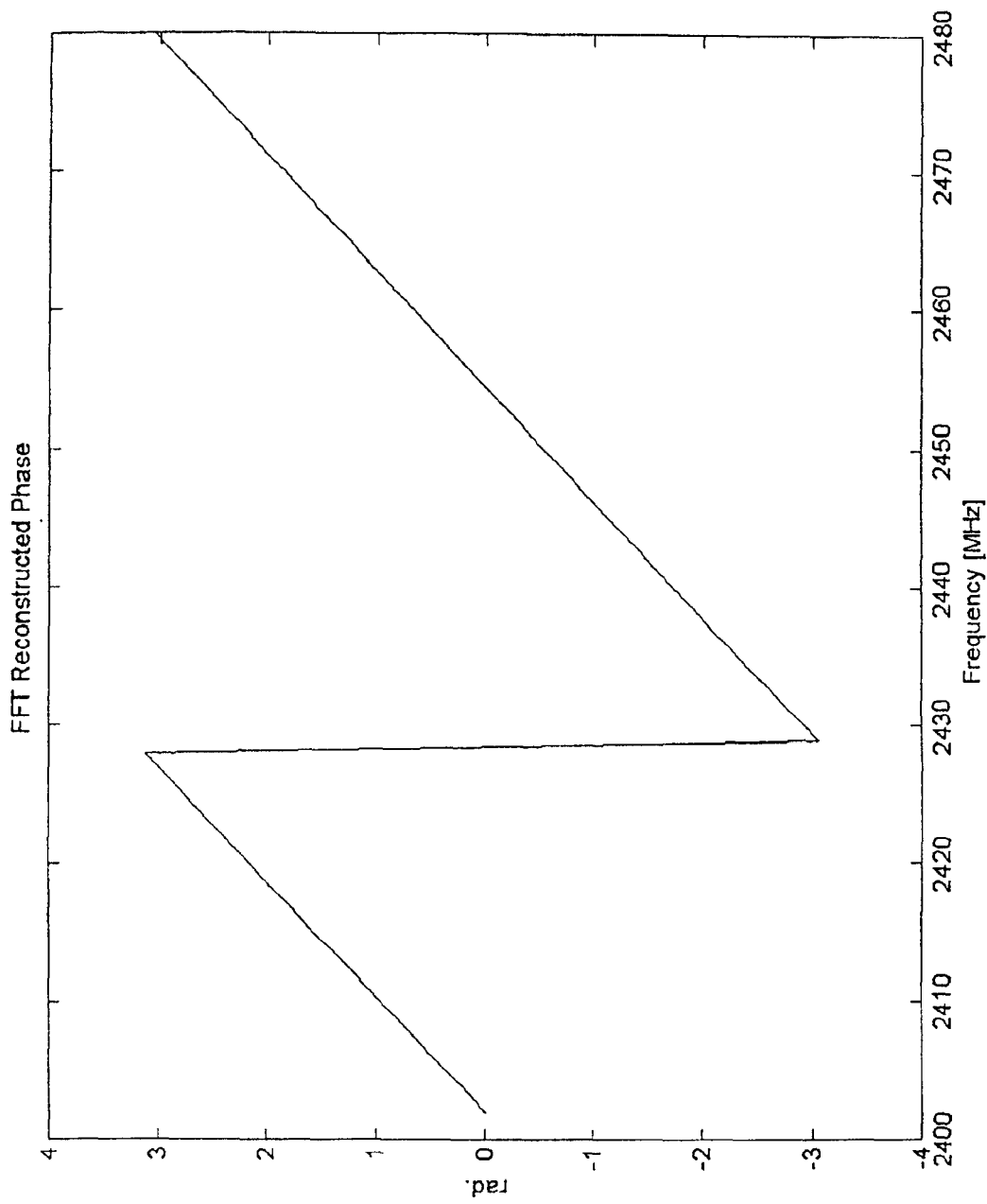
FIG. 11E provides a graph of the Fast Fourier Transform reconstructed phase of the information of FIG. 11C.
Figure 12:
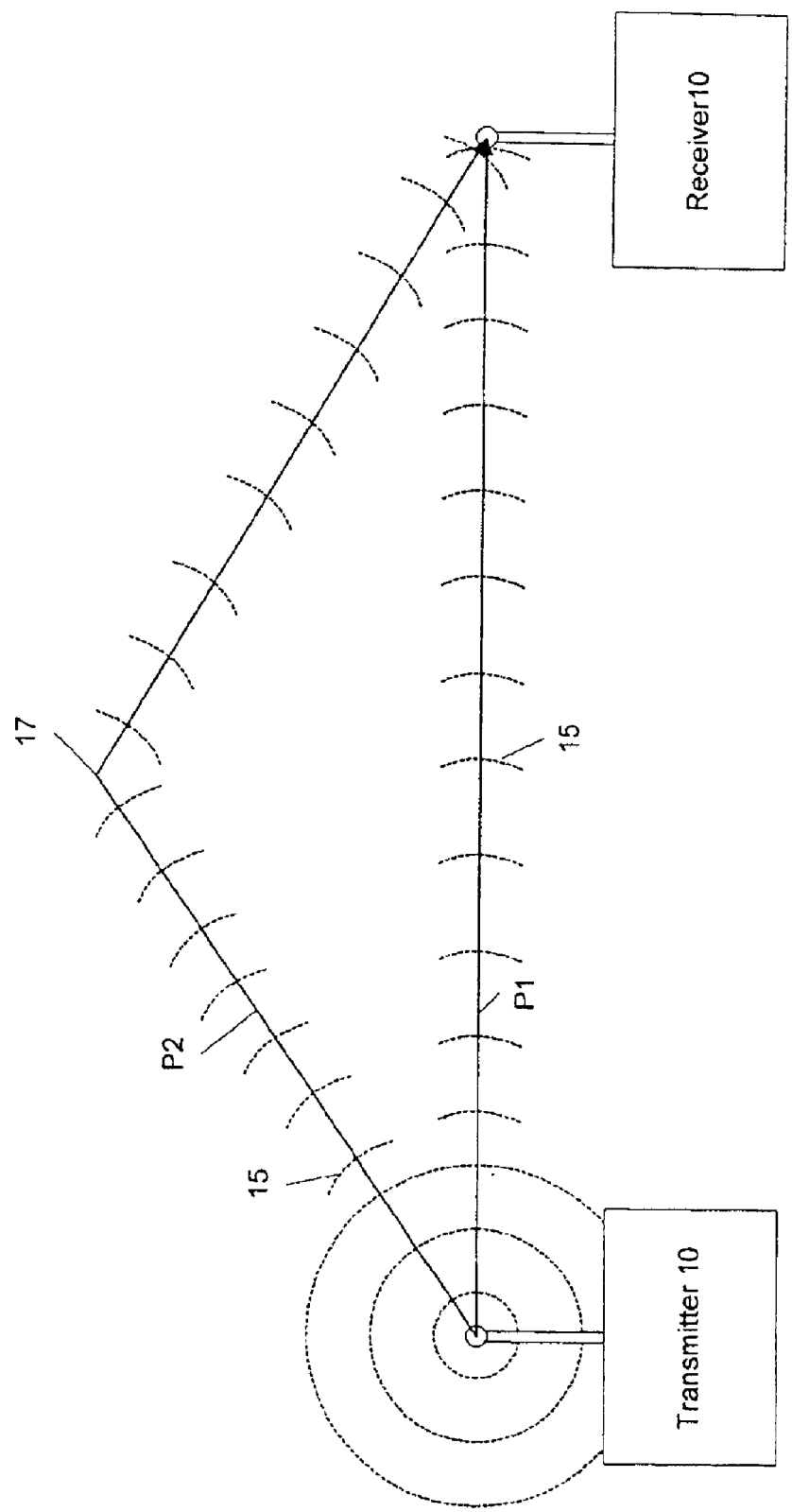
FIG. 12 provides a schematic illustrating the multipath phenomenon.

FIGS. 10D and 11D illustrate the selected peak graphed in the time domain. Alternatively, the selected peak can be identified by performing a time-to-frequency FFT and applying the phase slope method, for example, described in U.S. Application No. 09/759,601, on the resultant phase vs. frequency curve. FIGS. 10E and 11E illustrate the reconstructed phase FFT.

It should be noted that the examples of FIGS. 10A–10E and 11A and 11E are plotted in graph for to aid the reader's understanding of the invention. The processing described herein may be accomplished, at least in part, using processor 102 or other processing equipment by manipulating data sets stored in memory 105.

Following is a summary of the main effects of multipath on the phase-slope distance measuring system and the measures to take to counter it.

a) Multipath signals will distort the distance reading to a degree depending on the strength and delay time of the echoes.

b) The apparent delay in the presence of multipath can be corrected by analyzing the pass band amplitude and phase behavior to find relative echo strength and delay.

c) The degree of resolution of echoes depends on the number of frequency hops and total bandwidth of the system.

The present invention may be used with either full duplex or half-duplex distance measurement systems. In one embodiment of the present invention, the frequency-hopping scheme is implemented using Bluetooth technology. The distance measuring and/or signal processing concepts of the present invention may be implemented directly into the Bluetooth chip. Other platforms will be known to those skilled in the art and are within the scope of the present invention. Accordingly, the chip may include structure providing other digital signal processor (DSP) functionality.

The present invention may be used in a variety of applications including, but not limited to, mobile commerce, mobile banking, and information on demand. For example, commercial transactions between the two wireless devices may be directed based on the result of this distance measurement. If the distance between the units is within a specified criteria, information (advertisements, news, weather, travel) may be pushed from one unit to the other, payment for goods, services or information may be effected, or banking transactions initiated (e.g., obtaining account statement information, transferring funds between accounts). Other applications will be known to those skilled in the art and are within the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless transmission system comprising:
  a first wireless device including:
    a first receiver that receives a plurality of forward path radio frequency (RF) signals comprising a plurality of different carrier frequencies modulated with a modulation signal, the different carrier frequencies having approximately the same multipath transmission characteristics between the first and second wireless devices,
    a demodulator for detecting the modulation signal in said plurality of forward path RF signals,
    a synthesizer for generating a plurality of reverse path RF signals from the modulation signal, and
    a first transmitter for transmitting said plurality of reverse path RF signals, wherein the reverse path RF signals are phase coherent with the at least one forward path RF signal; and
  a second wireless device including:
    a second transmitter that transmits the plurality of forward path RF signals received by said first phase comparing the plurality of third RF signals and the plurality of reverse path RF signals.

2. The wireless transmission system according to claim 1, wherein said detector comprises a phase detector that generates quadrature amplitude and phase data.

3. The wireless transmission system according to claim 1, wherein the plurality of forward path RF signals and the reverse path RF signals are full duplex transmissions.

4. The wireless transmission system according to claim 1, wherein the plurality of forward path RF signals and the reverse paths RF signals are half duplex transmissions.

5. The wireless transmission system according to claim 1, wherein said second wireless device further comprises a second synthesizer for generating a plurality of third RF signals that are phase coherent with the modulation signal, wherein said detector includes a phase comparator for phase comparing the plurality of third RF signals and the plurality of reverse path RF signals.

6. The wireless transmission system according to claim 1, wherein said second wireless device further comprises a second synthesizer for generating a plurality of third RF signals that are phase coherent with the plurality of forward path RF signals, wherein said detector includes a phase comparator for plurality of forward path RF signals; and a processor that generates transmission path data using at least the detected amplitude and phase data and identifying from the transmission path data time delay information between the received RF signals traveling in a direct path from the first wireless device and the received RF signals traveling in at least one other path from the first wireless device, whereby error introduced by RF signals traveling in an indirect path is reduced or eliminated, wherein said synthesizer generates said plurality of third RF signals phase coherent with the modulation signal, and wherein said detector generates said amplitude and phase data using the received reverse path RF signals and the generated third RF signals.

7. The wireless transmission system according to claim 1, wherein the controller/Processor uses a Fourier transform to generate the transmission path data using the detected amplitude and phase data and the carrier frequencies.

8. The wireless transmission system according to claim 7, wherein the controller/processor further uses a peak search to identify the time delay information.

9. A wireless communication device comprising:

a transmitter that transmits a plurality of forward path RF signals comprising a plurality of different carrier frequencies modulated with a modulation signal, the different carrier frequencies having approximately the same multipath transmission characteristics between the first and second wireless devices;

a receiver that receives a sequence of reverse path RF signals from a first wireless communication device, wherein the received reverse path RF signals are phase coherent with the plurality of forward path RF signals;

a synthesizer for generating said forward path RF signals;

a detector that generates amplitude and phase data based on the received reverse path RF signals and at least one signal of the receiver of the first wireless device, a second receiver that receives the reverse path RF signals, a detector that generates amplitude and phase comparison data based on at least the received reverse path RF signal, and a controller/processor that generates transmission path data using the detected amplitude and phase data and the carrier frequencies and identifies from the transmission path data time delay information for RF signals traveling in a direct path between the first and second wireless device, whereby error introduced by RF signals traveling in an indirect path is reduced or eliminated, and wherein said synthesizer generates said plurality of reverse path RF signals from the plurality of forward path RF signals and each of said plurality of reverse path RF signals is phase coherent with a corresponding one of said plurality of forward path RF signals.

10. The wireless communication device according to claim 9, wherein said detector comprises a phase detector that generates quadrature amplitude and phase data.

11. The wireless communication device according to claim 9, wherein the plurality of forward path RF signals are frequency hopping spread spectrum signals.

12. The wireless communication device according to claim 9, further comprising a synthesizer for generating a plurality of third RF signals that are phase coherent with the carrier frequencies of the plurality of forward path RF signals, and wherein said detector generates said amplitude and phase data using the received reverse path RF signals and the generated third RF signals.

13. The wireless communication device according to claim 9, wherein said transmitter and receiver transmit and receive the plurality of forward path RF signals and the reverse paths RF signals in full duplex.

14. The wireless communication device according to claim 9, wherein said transmitter and receiver transmit and receive the plurality of forward path RF signals and the reverse path RF signals in half duplex.

15. The wireless communication device according to claim 9, wherein the processor uses a Fourier transform to generate the transmission path data using the detected amplitude and phase data and the carrier frequencies.

16. The wireless communication device according to claim 15, wherein the processor further uses a peak search to identify the time delay information.

17. The wireless communication device according to claim 15, wherein the processor determines the distance between the wireless communication device and the first wireless device based on the time delay information.

18. A wireless communication device comprising:

a transmitter that transmits a plurality of forward path signals comprising a plurality of different carrier frequencies modulated with a modulation signal, the different carrier frequencies having approximately the same multipath transmission characteristics between the first and second wireless devices;

a receiver that receives a sequence of reverse path RF signals from a first wireless communication device, wherein the received reverse path RF signals are phase coherent with the plurality of forward path signals;

a synthesizer that generates a plurality of local RF signals using the plurality of forward path signals;

a phase comparator that generates amplitude and phase data based on the received reverse path RF signals and the local RF signals; and a processor that generates transmission path data using the detected amplitude and phase data and frequency information of the received reverse path RF signals and identifying from the transmission path data time delay information between the received reverse path RF signals+traveling in a direct path from the first wireless device and the received RF signals traveling in at least one other path from the first wireless device, whereby error introduced by RF signals traveling in an indirect path is reduced or eliminated, wherein said synthesizer generates said plurality of local RF signals phase coherent with the plurality of forward path RF signals, and wherein said phase comparator generates said amplitude and phase data using the received reverse path RF signals and the generated local RF signals.

19. A wireless communication device comprising:

a transmitter that transmits a plurality of forward path signals comprising a plurality of different carrier frequencies modulated with a modulation signal, the different carrier frequencies having approximately the same multipath transmission characteristics between the first and second wireless devices;

a receiver that receives a sequence of reverse path RF signals from a first wireless communication device, wherein the received reverse path RF signals are phase coherent with the forward path signals;

a synthesizer that generates a plurality of local RF signals that are phase coherent with the forward path signals;

a detector that generates amplitude and phase data based on the received reverse path RF signals and the local RF signals; and a processor that calculates a direct path distance between the wireless communication device and the first wireless communication device using the detected amplitude and phase data and frequency information of the received reverse path RF signals, whereby error introduced by RF signals traveling in an indirect path is reduced or eliminated, wherein said synthesizer generates said plurality of local RF signals phase coherent with the plurality of forward path RF signals, and wherein said detector generates said amplitude and phase data using the received reverse path RF signals and the generated local RF signals.

* * * * *